(12) United States Patent
Fukushima et al.

(10) Patent No.: US 12,395,738 B2
(45) Date of Patent: Aug. 19, 2025

(54) CAMERA MODULE, PORTABLE ELECTRONIC DEVICE, AND POSITION CONTROL SYSTEM

(71) Applicant: Asahi Kasei Microdevices Corporation, Tokyo (JP)

(72) Inventors: Takashi Fukushima, Tokyo (JP); Keita Okada, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/959,259

(22) Filed: Oct. 3, 2022

(65) Prior Publication Data

US 2023/0156336 A1 May 18, 2023

(30) Foreign Application Priority Data

Nov. 15, 2021 (JP) ................. 2021-185978

(51) Int. Cl.
*H04N 23/68* (2023.01)
*G02B 27/64* (2006.01)
*G03B 5/00* (2021.01)
*H04N 23/695* (2023.01)

(52) U.S. Cl.
CPC ......... *H04N 23/687* (2023.01); *G02B 27/646* (2013.01); *G03B 5/00* (2013.01); *H04N 23/695* (2023.01); *G03B 2205/0007* (2013.01)

(58) Field of Classification Search
None
See application file for complete search history.

(56) References Cited

U.S. PATENT DOCUMENTS

| | | | |
|---|---|---|---|
| 8,976,469 B2 | 3/2015 | Ku | |
| 9,904,153 B2 | 2/2018 | Shimizu | |
| 11,039,071 B2 | 6/2021 | Min | |
| 11,997,386 B2 | 5/2024 | Oh | |
| 2005/0213111 A1 | 9/2005 | Suzuki | |
| 2009/0034950 A1 | 2/2009 | Takagi | |
| 2010/0295496 A1 | 11/2010 | Okita | |
| 2012/0050577 A1 | 3/2012 | Hongu | |

(Continued)

FOREIGN PATENT DOCUMENTS

| | | |
|---|---|---|
| CN | 113489910 A | 10/2021 |
| JP | 2000207027 A | 7/2000 |

(Continued)

*Primary Examiner* — Twyler L Haskins
*Assistant Examiner* — Wesley J Chiu

(57) ABSTRACT

Provided is a camera module, comprising a controller including a first position control unit generating a first position control signal indicating a first target position to which an object provided with an image sensor or a lens is to be moved, and a first master port outputting the first position control signal, a first driver including a first slave port connected to the first master port, a first driving unit providing driving force to the object based on the first position control signal, a second position control unit generating a second position control signal indicating a second target position to which the object is to be moved, and a second master port outputting the second position control signal, and a second driver including a second slave port connected to the second master port, a second driving unit providing driving force to the object based on the second position control signal.

7 Claims, 21 Drawing Sheets

(56) References Cited

U.S. PATENT DOCUMENTS

| | | |
|---|---|---|
| 2013/0258506 A1 | 10/2013 | Lee |
| 2016/0044246 A1 | 2/2016 | Yamada |
| 2016/0212344 A1 | 7/2016 | Takeuchi |
| 2016/0269644 A1 | 9/2016 | Cheong |
| 2016/0327806 A1 | 11/2016 | Kasamatsu |
| 2017/0244899 A1 | 8/2017 | Abe |
| 2017/0358101 A1 | 12/2017 | Bishop |
| 2018/0184005 A1 | 6/2018 | Morotomi |
| 2018/0234529 A1 | 8/2018 | Yu |
| 2018/0307004 A1 | 10/2018 | Nagaoka |
| 2019/0215463 A1 | 7/2019 | Shirane |
| 2019/0285967 A1* | 9/2019 | Himei .................... H04N 23/68 |
| 2020/0026154 A1 | 1/2020 | Kawai |
| 2020/0099859 A1* | 3/2020 | Uchiyama ............. H04N 23/65 |
| 2020/0116975 A1 | 4/2020 | Sakamoto |
| 2020/0120283 A1* | 4/2020 | Min ....................... H04N 23/55 |
| 2020/0153366 A1 | 5/2020 | I |
| 2020/0195849 A1* | 6/2020 | Byun .................. H04N 23/687 |
| 2021/0096389 A1 | 4/2021 | Kim |
| 2021/0227110 A1* | 7/2021 | Kang ..................... G03B 13/36 |
| 2021/0227114 A1* | 7/2021 | Min ..................... H04N 23/685 |
| 2021/0382844 A1* | 12/2021 | Kim .................... G06F 13/1605 |
| 2022/0116537 A1 | 4/2022 | Kil |
| 2022/0264010 A1* | 8/2022 | Ito ........................ G02B 27/646 |
| 2022/0360713 A1* | 11/2022 | Shin ...................... H04N 23/57 |
| 2024/0241341 A1 | 7/2024 | Fujii |

FOREIGN PATENT DOCUMENTS

| | | |
|---|---|---|
| JP | 2006101570 A | 4/2006 |
| JP | 5061982 B2 | 10/2012 |
| JP | 2012247578 A | 12/2012 |
| JP | 2013235044 A | 11/2013 |
| JP | 2017083492 A | 5/2017 |
| JP | 2017097109 A | 6/2017 |
| JP | 2018045484 A | 3/2018 |
| JP | 2019013117 A | 1/2019 |
| JP | 2020013087 A | 1/2020 |
| JP | 2020064283 A | 4/2020 |
| KR | 20180067122 A | 6/2018 |
| KR | 20210127658 A | 10/2021 |
| WO | 2021112525 A1 | 6/2021 |

* cited by examiner

CAMERA MODULE, PORTABLE ELECTRONIC DEVICE, AND POSITION CONTROL SYSTEM

The contents of the following Japanese patent application(s) are incorporated herein by reference:
NO. 2021-185978 filed in JP on Nov. 15, 2021

BACKGROUND

1. Technical Field

The present invention relates to a camera module, a portable electronic device, and a position control system.

2. Related Art

Patent document 1 describes that "a single master port M disposed on an OIS controller 221 is connected to slave ports S each disposed on a first OIS driver 222a and a second OIS driver 222b".

PRIOR ART DOCUMENT

Patent Document

[Patent document 1] Specification of U.S. Pat. No. 11,039,071

SUMMARY

In a first aspect of the present invention, a camera module is provided. The camera module may include a controller including a first position control unit configured to generate a first position control signal indicating a first target position to which an object provided with an image sensor or a lens is to be moved, and a first master port configured to output the first position control signal. The camera module may include a first driver including a first slave port connected to the first master port, a first driving unit configured to provide driving force to the object based on the first position control signal, a second position control unit configured to generate a second position control signal indicating a second target position to which the object is to be moved, and a second master port configured to output the second position control signal. The camera module may include a second driver including a second slave port connected to the second master port, and a second driving unit configured to provide driving force to the object based on the second position control signal.

The first driver may further include a first sensor configured to detect a position of the object. The first driving unit may be configured to provide driving force to the object based on a first position signal indicating a position of the object detected by the first sensor, and the first position control signal.

The second driver may further include a second sensor configured to detect a position of the object. The second driving unit may provide driving force to the object based on a second position signal indicating a position of the object detected by the second sensor, and the second position control signal.

The first driver may further include a calculating unit configured to correct at least any of the first position control signal, the first position signal, and the second position control signal at least based on the second position signal obtained via the second master port.

The calculating unit may be configured to correct at least any of the first position control signal, the first position signal, and the second position control signal in such a way so as to reduce mutual interference by drive of the object by the first driver and drive of the object by the second driver.

When the first driver is configured to drive a first object provided with a first lens, and the second driver is configured to drive a second object provided with a second lens, the calculating unit may be configured to correct at least any of the first position control signal, the first position signal, and the second position control signal in such a way so that the first object and the second object interlock.

In a second aspect of the present invention, a camera module is provided. The camera module may include a controller including a position control unit configured to generate a position control signal indicating a target position to which an object provided with a lens is to be moved, and a first master port configured to output the position control signal. The camera module may include a driver including a first slave port connected to the first master port, a second master port to which a position detector has a slave connection, and a driving unit configured to provide driving force to the object based on position information indicating a position of the object detected by the position detector, and the position control signal.

The driver may further include a sensor configured to detect a position of the object. The driving unit may be configured to provide driving force to the object based on a position signal indicating a position of the object detected by the sensor, the position information, and the position control signal.

The driver may further include a calculating unit configured to correct tilt in relation to an optical axis of the lens in the object based on the position information.

In the camera module, communication between master and slave may be serial communication.

The camera module may be capable of executing at least any of optical image stabilization, auto focus, and zoom processes.

In the second aspect of the present invention, a portable electronic device is provided. The portable electronic device may include a controller including a first position control unit configured to generate a first position control signal indicating a first target position to which an object provided with an image sensor or a lens is to be moved, and a first master port configured to output the first position control signal. The portable electronic device may include a first driver including a first slave port connected to the first master port, a first driving unit configured to provide driving force to the object based on the first position control signal, a second position control unit configured to generate a second position control signal indicating a second target position to which the object is to be moved, and a second master port configured to output the second position control signal. The portable electronic device may include a second driver including a second slave port connected to the second master port, a second driving unit configured to provide driving force to the object based on the second position control signal.

In a third aspect of the present invention, a position control system is provided. The position control system may include a controller including a first position control unit configured to generate a first position control signal indicating a first target position to which an object provided with an image sensor or a lens is to be moved, and a first master port configured to output the first position control signal. The position control system may include a first driver including a first slave port connected to the first master port, a first driving unit configured to provide driving force to the object based on the first position control signal, a second position control unit configured to generate a second position control signal indicating a second target position to which the object is to be moved, and a second master port configured to output the second position control signal. The position control system may include a second driver including a second slave port connected to the second master port, a second driving unit configured to provide driving force to the object based on the second position control signal.

The summary clause does not necessarily describe all necessary features of the embodiments of the present invention. In addition, the present invention may also be a sub-combination of the features described above.

DESCRIPTION OF EXEMPLARY EMBODIMENTS

In the following, the present invention will be described through embodiments of the invention, but the following embodiments do not limit the invention according to the scope of claims. In addition, not all of the combinations of features described in the embodiments are essential to the solving means of the invention.

Figure 1:
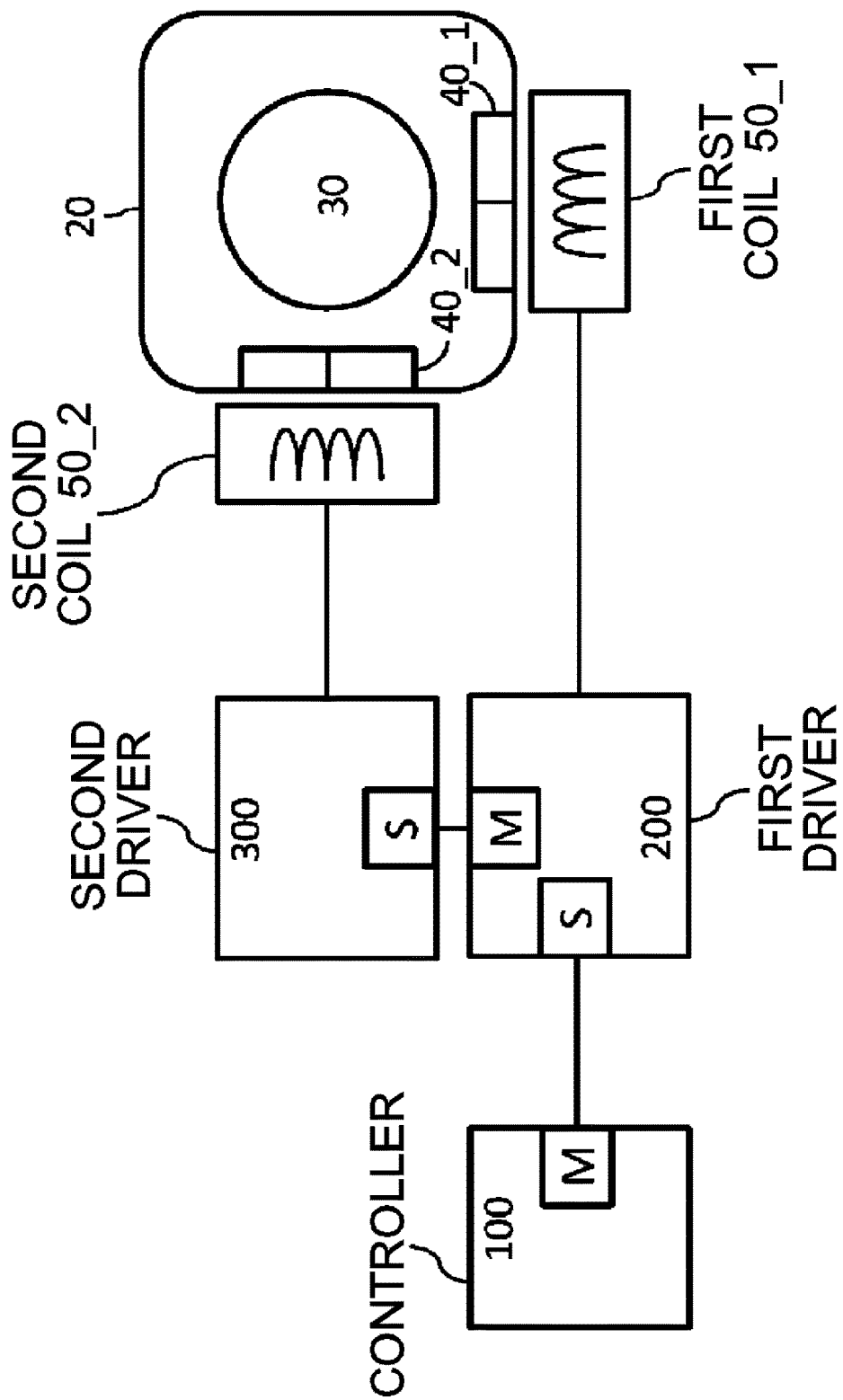
FIG. 1 shows an example of a block diagram of a camera module 10 according to a first embodiment.

FIG. 1 shows an example of a block diagram of a camera module 10 according to a first embodiment. It is noted that these blocks are function blocks each separated by function, and they may not necessarily match the actual device configuration. That is, in the present drawing, even if it is shown as one block, it may not necessarily be configured by one device. In addition, in the present drawing, even if they are shown as different blocks, they may not necessarily be configured by different devices. The same can be said for other drawings.

In addition, hereinafter, the camera module 10 is described as an example, but it is not limited to this. A portable electronic device or a position control system including a similar function to that of the camera module 10 described in the following may be provided. Such things include, for example, a cell phone, a smart phone, a tablet device, a PDA, a portable computer, a laptop, and a notebook personal computer, or an external system for controlling a position of an object.

The camera module 10 may be capable of executing at least any of optical image stabilization, auto focus, and zoom processes. In this case, in the camera module 10, a controller does not centrally control a plurality of drivers alone, but at least one driver is also for performing a function as a sub-controller, and the controller and the sub-controller work together to separately control the plurality of drivers. In the first embodiment, a case where the camera module 10 executes a lens shift type optical image stabilization (OIS) process is described.

The camera module 10 includes an object 20, a first coil 50_1 and a second coil 50_2 (generically referred to as "coils 50"), a controller 100, a first driver 200, and a second driver 300.

The object 20 is a device that changes position according to an input signal. Hereinafter, a case where the object 20 is a lens barrel will be described as an example. In the present embodiment, the object 20 is provided with a lens 30, a first magnet 40_1 and a second magnet 40_2 (generically referred to as magnets 40).

The lens 30 is an optical element for refracting and focusing light. In the lens shift type OIS process, by moving the object 20 and shifting the lens 30, the optical axis is maintained in the center portion of the image to mitigate video distortion due to camera shake.

The magnets 40 are permanent magnets. In the present embodiment, the first magnet 40_1 is disposed along an x axis direction. In addition, the second magnet 40_2 is disposed along a y axis direction.

The coils 50 are wound along a certain direction. In the present embodiment, the first coil 50_1, nearby the first magnet 40_1, is wound along the x axis direction similarly to the first magnet 40_1. In addition, the second coil 50_2, nearby the second magnet 40_2, is wound along the y axis direction similarly to the second magnet 40_2. When a driving current is supplied to such the first coil 50_1 and the second coil 50_2, since a magnetic force is respectively generated between the first coil 50_1 and the first magnet 40_1 and between the second coil 50_2 and the second magnet 40_2, the object 20 is displaced. In this way, it is possible to correct a two axis blur.

The controller 100 is a high-order controller for controlling a driver. In the present embodiment, the controller 100 may be an OIS controller. In the present embodiment, the controller 100 has a master connection in relation to the first driver 200, and outputs a generated first position control signal to the first driver 200.

The first driver 200 is a driver for providing driving force to the object 20. In the present embodiment, the first driver 200 may be an OIS driver. The first driver 200 has a slave connection in relation to the controller 100, and supplies a driving current to the first coil 50_1 based on the first position control signal output from the controller 100. In addition, the first driver 200 is also for performing a function as a sub-controller. That is, the first driver 200 has a master connection in relation to the second driver 300, and outputs a generated second position control signal to the second driver 300.

The second driver 300 is a driver for providing driving force to the object 20. In the present embodiment, the second driver 300 may be an OIS driver. The second driver 300 has a slave connection in relation to the first driver 200, and supplies a driving current to the second coil 50_2 based on the second position control signal output from the first driver 200.

Herein, in the present embodiment, the communication path between the controller 100 and the first driver 200 is defined as a first communication bus, and the communication path between the first driver 200 and the second driver 300 is defined as a second communication bus. Communication between master and slave in such the first communication bus and the second communication bus may be, for example, serial communication such as an Inter-Integrated Circuit (I2C). In I2C, in general, one master and one or more slaves are connected in a party line shape by two signal lines, a clock signal line SCL and a data signal line SDA. In addition, each slave has an address, and only one slave designated with the address included in the data communicates one-on-one with the master.

Then, the controller 100, the first driver 200, and the second driver 300 will each be described in detail.

Figure 2:
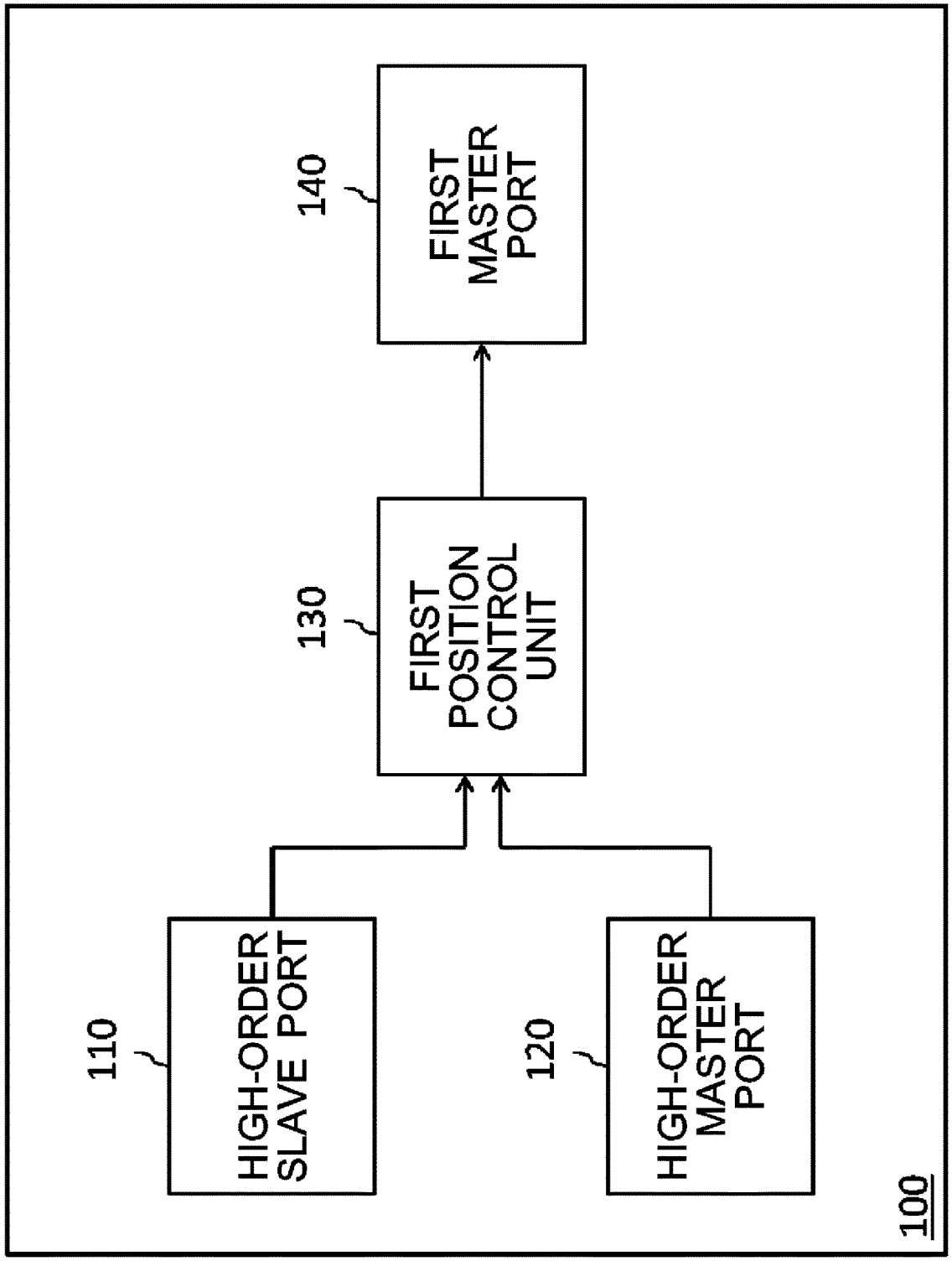
FIG. 2 shows an example of a block diagram of the controller 100.

FIG. 2 shows an example of a block diagram of the controller 100. The controller 100 includes a high-order slave port 110, a high-order master port 120, a first position control unit 130, and a first master port 140.

The high-order slave port is connected to a master port of a host (not shown). Such a host may be, for example, an Image Signal Processor (ISP). The ISP is an image processor in a camera system. The controller 100 obtains a high-order control signal from the host via the said high-order slave port 110. The obtained high-order control signal is supplied to the first position control unit 130.

The high-order master port 120 is connected to a slave port of a gyro sensor (not shown). The controller 100 obtains a gyro signal from the gyro sensor via the said high-order master port 120. The obtained gyro signal is supplied to the first position control unit 130.

The first position control unit 130 generates a first position control signal for indicating a first target position to which the object 20 provided with the lens 30 is to be moved. In the present embodiment, the first position control unit 130 triggers the OIS process based on the high-order control signal. The first position control unit 130 generates the first position control signal for indicating a target position Vt_X in the x axis direction and a target position Vt_Y in the y axis direction based on the gyro signal. The first position control unit 130 supplies the generated first position control signal to the first master port 140.

The first master port 140 is connected to a slave port in the first driver 200. The first master port 140 outputs the first position control signal generated by the first position control unit 130 to the first driver 200.

Figure 3:
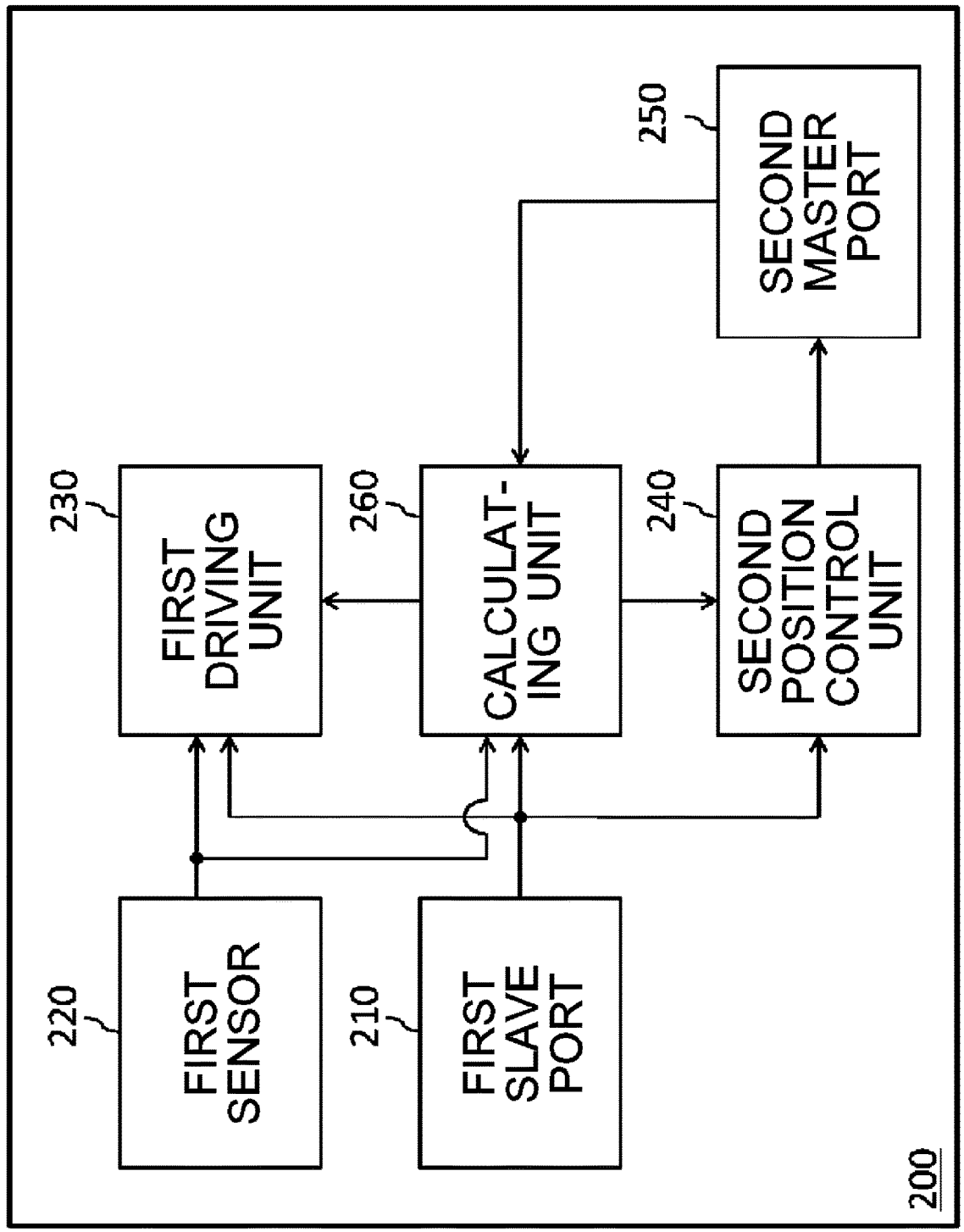
FIG. 3 shows an example of a block diagram of the first driver 200.

FIG. 3 shows an example of a block diagram of the first driver 200. The first driver 200 includes a first slave port 210, a first sensor 220, a first driving unit 230, a second position control unit 240, a second master port 250, and a calculating unit 260.

The first slave port 210 is connected to the first master port 140 in the controller 100. The first driver 200 obtains the first position control signal from the controller 100 via the said first slave port 210. The obtained first position control signal is supplied to the first driving unit 230, the second position control unit 240, and the calculating unit 260.

The first sensor 220 detects a position of the object 20. The first sensor 220 may be, for example, a magnetic sensor, and may detect the position of the object 20 by detecting a magnetic field that is generated from the first magnet 40_1 provided on the object 20. Such a magnetic sensor, as an example, may be a hall sensor for providing a hall effect and detecting a change in an external magnetic field from a generated electromotive force. However, it is not limited to this. The magnetic sensor may be various sensors that can detect a magnetic field such as a spin valve type magneto resistive sensor (such as GMR element, TMR element) for changing resistance according to change in the external magnetic field, and may be a combination of these various sensors. In addition, the first sensor 220 may be configured by a sensor element group made up of a plurality of sensor elements. The first sensor 220 supplies the first position signal indicating a position Vp_1 of the detected object 20 to the first driving unit 230 and the calculating unit 260.

The first driving unit 230 applies driving force to the object 20 based on the first position control signal. In this case, as an example, the first driving unit 230 may execute PID control. Herein, PID control is a type of feedback control, and is a type of control for performing control of an input value by three elements which are a deviation between an output value and a target value, and an integral and a derivative thereof. There is proportional control (P control) as a basic feedback control. This controls the input value as a linear function of the deviation between the output value and the target value. This action for changing the input value in proportion to the deviation is called proportional action, or alternatively, P action (P is an abbreviation of Proportional). That is, if a state with deviation continues for a long time, the change of the input value is increased to bring it closer to the target value. In addition, this action for changing the input value in proportion to the integral of the deviation is called integral action, or alternatively, I action (I is an abbreviation for Integral). In this manner, control in which the proportional action and the integral action are combined is called PI control. In addition, this action for changing the input value in proportion to the derivative of the deviation is called derivative action, or alternatively, D action (D is an abbreviation of Derivative or Differential). Control in which such the proportional action, integral action, and derivative action are combined is called PID control. That is, the first driving unit 230 may provide the driving force to the object 20 by executing PID control based on the first position signal indicating the position of the object 20 detected by the first sensor 220, and the first position control signal. In more detail, the first driving unit 230 may generate a first control signal for moving the position Vp_1 of the object 20 indicated by the first position signal to the target position Vt_X in the x axis direction indicated by the first position control signal. The first driving unit 230 may supply a driving current according to the first control signal to the first coil 50_1.

The second position control unit 240 generates the second position control signal indicating a second target position to which the object is to be moved. In the present embodiment, the second position control unit 240 generates the second position control signal indicating the target position Vt_Y in the y axis direction. In this case, for the target position Vt_Y in the y axis direction, the second position control unit 240 may use what is indicated by the first position control signal as is, and may use the target position Vt_Y that has been corrected by the calculating unit 260 described below. The second position control unit 240 supplies the generated second position control signal to the second master port 250.

The second master port 250 is connected to a slave port of the second driver 300. The second master port 250 outputs the second position control signal generated by the second position control unit 240 to the second driver 300. In addition, the first driver 200 obtains the second position signal indicating the position of the object 20 that has been detected by a second sensor described below from the second driver 300 via the said second master port 250. The obtained second position signal is supplied to the calculating unit 260.

The calculating unit 260 corrects at least any of the first position control signal, the first position signal, and the second position control signal based on at least the second position signal obtained via the second master port 250. When a two axis blur is corrected by OIS, a drive in one axis may provide mutual interference to a drive in the other axis. For example, when a driving current is supplied to the first coil 50_1 from the first driver 200, the magnetic field generated by the first coil 50_1 may provide an effect on position detection by the second sensor. In addition, according to this, when the object 20 is displaced, the magnetic field generated by the first magnet 40_1 may provide an effect on the position detection by the second sensor. In the same way, when the driving current is supplied to the second coil 50_2 from the second driver 300, the magnetic field generated by the second coil 502 may provide an effect on position detection by the first sensor 220. In addition, according to this, when the object 20 is displaced, the magnetic field generated by the second magnet 40_2 may provide an effect on the position detection by the first sensor 220. In order to mitigate such an effect, the calculating unit 260 may correct at least any of the first position control signal, the first position signal, and the second position control signal in such a way so as to reduce the mutual interference by the drive of the object 20 by the first driver 200 and the drive of the object 20 by the second driver 300. The calculating unit 260, when it has corrected at least any of the first position control signal and the first position signal, notifies said effect to the first driving unit 230. In this way, the first driving unit 230 executes PID control based on at least any of the corrected first position control signal and the first position signal. In addition, the calculating unit 260, when it has corrected the second position control signal, notifies said effect to the second position control unit 240. According to this, the second position control unit 240 supplies the corrected second position control signal to the second master port 250.

Figure 4:
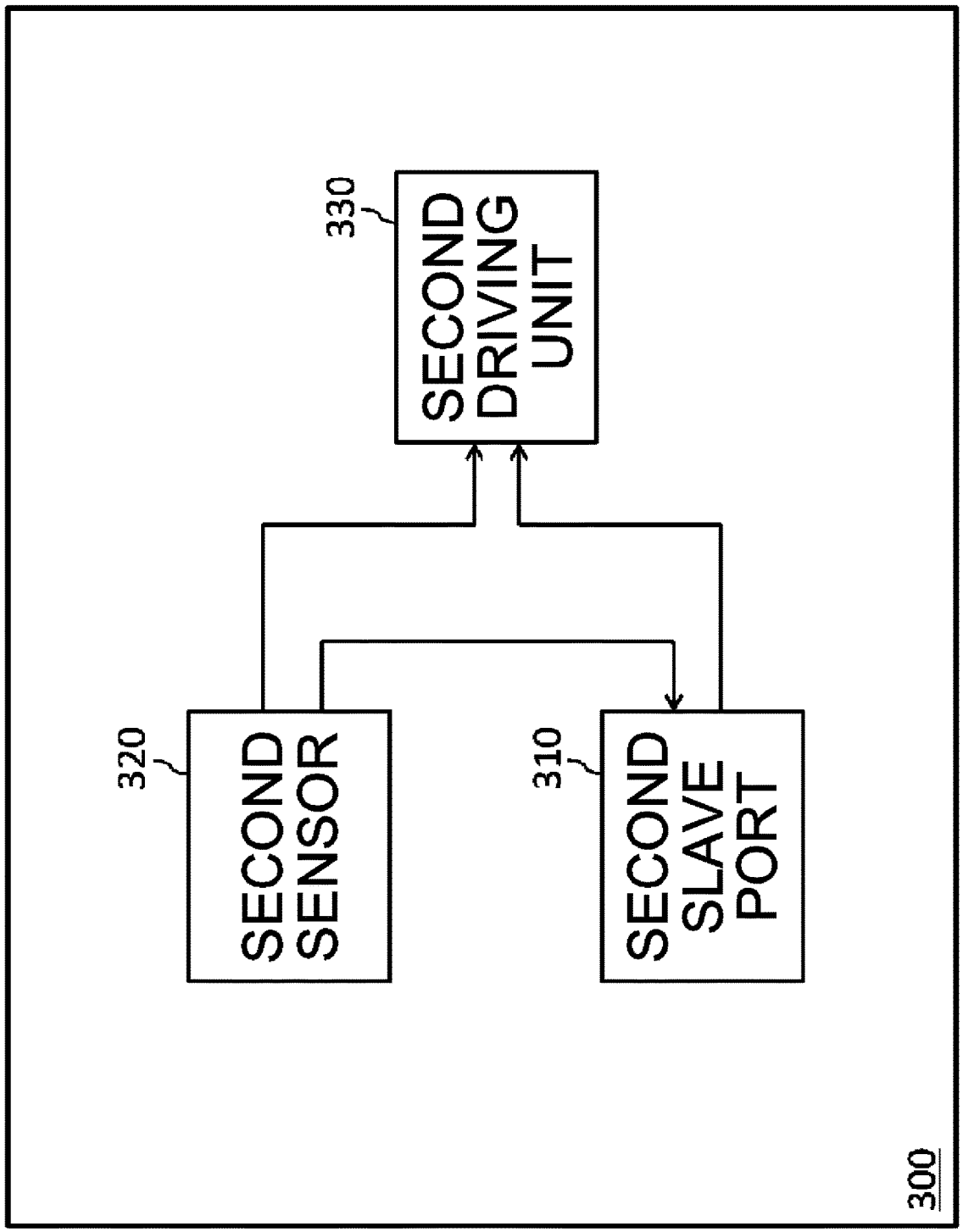
FIG. 4 shows an example of a block diagram of the second driver 300.

FIG. 4 shows an example of a block diagram of the second driver 300. The second driver 300 includes a second slave port 310, a second sensor 320, and a second driving unit 330.

The second slave port 310 is connected to the second master port 250 in the first driver 200. The second driver 300 obtains the second position control signal from the first driver 200 via the said second slave port 310. The obtained second position control signal is supplied to the second driving unit 330. In addition, the second slave port 310 outputs the second position signal indicating the position of the object 20 detected by the second sensor 320 to the first driver 200.

The second sensor 320 detects the position of the object 20. The second sensor 320 may be similar to the first sensor 220 in the first driver 200, so its description is omitted herein. The second sensor 320 supplies the second position signal indicating a position Vp_2 of the detected object to the second slave port 310 and the second driving unit 330.

The second driving unit 330 applies driving force to the object 20 based on the second position control signal. The second driving unit 330 may be similar to the first driving unit 230 in the first driver 200. That is, the second driving unit 330 may provide the driving force to the object 20 by executing PID control based on the second position signal indicating the position of the object 20 detected by the second sensor 320 and the second position control signal. In more detail, the second driving unit 330 may generate a second control signal for moving the position Vp_2 of the object indicated by the second position signal to the target position Vt_Y in the y axis direction indicated by the second position control signal. The second driving unit 330 may supply a driving current according to the second control signal to the second coil 50_2.

Figure 5:
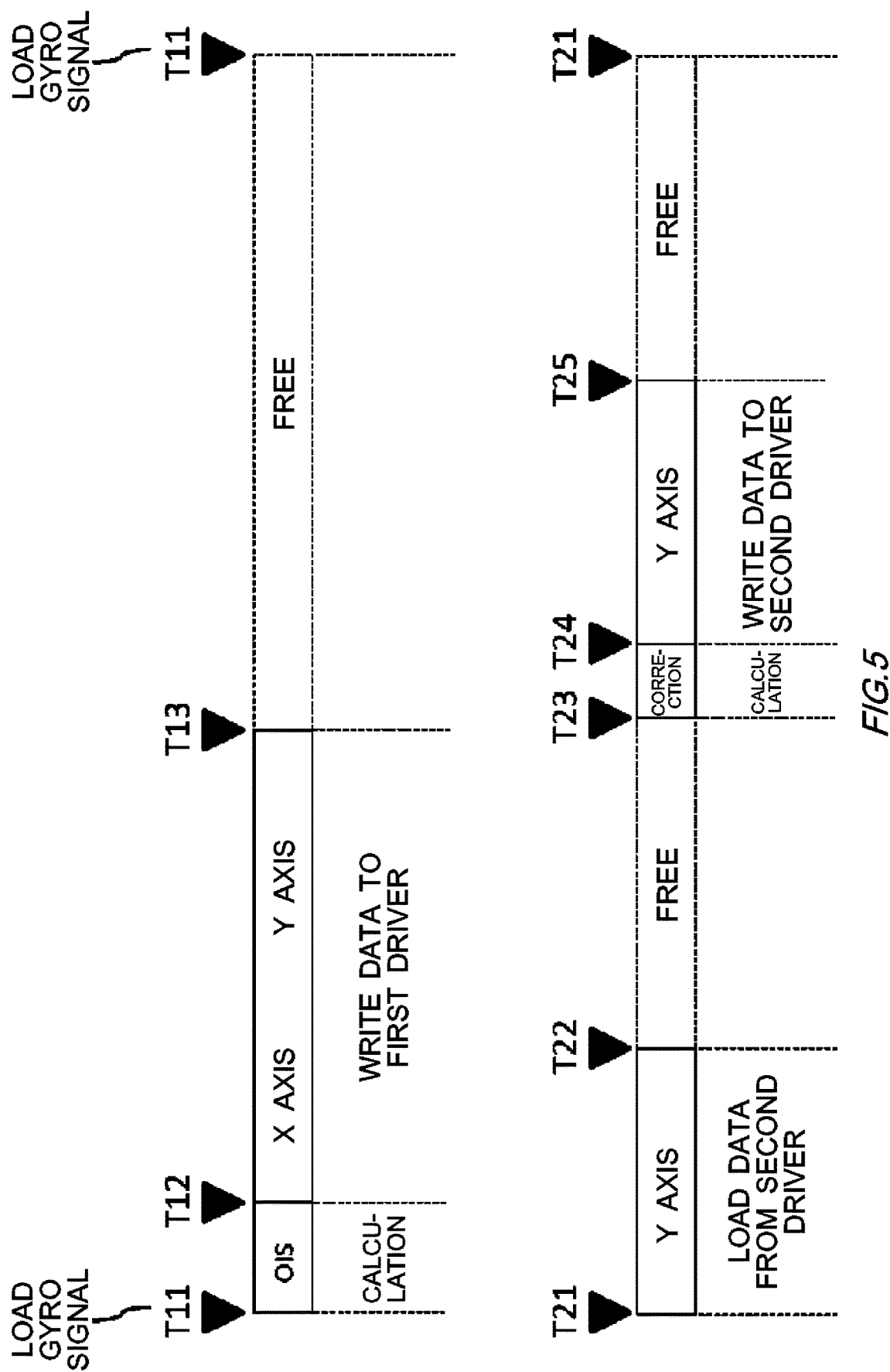
FIG. 5 shows an example of a timing diagram of the camera module 10 according to the first embodiment.

FIG. 5 shows an example of a timing diagram of the camera module 10 according to the first embodiment. The upper part of the present drawing shows a process in connection to the first communication bus in between the controller 100 and the first driver 200. The lower part of the present drawing shows a process in connection to the second communication bus in between the first driver 200 and the second driver 300. In addition, in the present drawing, the horizontal axis indicates time.

First, focusing on the process in connection to the first communication bus (the upper part of the present drawing), at time T11, the controller 100 loads the gyro signal obtained from the gyro sensor via the high-order master port 120. The first position control unit 130 executes OIS calculation based on the gyro signal, and generates the first position control signal indicating the target position Vt_X in the x axis direction and the target position Vt_Y in the y axis direction. The first position control unit 130 supplies the generated first position control signal to the first master port 140.

At time T12, the first master port 140 outputs the first position control signal generated by the first position control unit 130 to the first driver 200. According to this, the first driver 200 obtains the first position control signal via the first slave port 210. In this manner, in the period from time T12 to T13, a writing process of data (the target position of the x axis direction and the y axis direction) to the first driver 200 is executed. From time T13 and later, until the next gyro signal is loaded, the process in connection to the first communication bus becomes free.

Then, focusing on the process in connection to the second communication bus (the lower part of the present drawing), at time T21 (=time T11), the second sensor 320 detects the position of the object 20. The second sensor 320 supplies the second position signal indicating the detected position of the object 20 to the second slave port 310 and the second driving unit 330. The second slave port 310 outputs the second position signal to the first driver 200. According to this, the first driver 200 obtains the second position signal via the second master port 250. In this manner, in the period from time T21 to T22, a loading process of data (the detection position of the y axis direction) from the second driver 300 is executed. From time T22 and later, until time T23 (=time T13) when the writing process of data to the first driver 200 ends, the process in connection to the second communication bus becomes free.

It is noted that the first driver 200, at any time until time T23, may detect the position of the object 20 and make the first position signal indicating the detected position of the object 20 in a state in which it is available. That is, the first sensor 220, at any time until time T23, may detect the position of the object 20, and supply the first position signal indicating the detected position of the object 20 to the first driving unit 230 and the calculating unit 260.

At time T23, the calculating unit 260 executes the correcting calculation and corrects at least any of the first position control signal, the first position signal, and the second position control signal. The calculating unit 260 corrects at least any of the first position control signal and the first position signal and notifies said effect to the first driving unit 230. According to this, the first driving unit 230 applies driving force to the object 20 by executing PID control based on at least any of the corrected first position control signal and the first position signal. In addition, the calculating unit 260 corrects the second position control signal and notifies said effect to the second position control unit 240. According to this, the second position control unit 240 supplies the corrected second position control signal to the second master port 250.

At time T24, the second master port 250 outputs the second position control signal to the second driver 300. According to this, the second driver 300 obtains the second position control signal via the second slave port 310. In this manner, in the period from time T24 to T25, a writing process of data (the target position of the y axis direction) to the second driver 300 is executed. According to this, the second driving unit 330 applies driving force to the object 20 by executing PID control based on the second position control signal and the second position signal. From time T25 and later, until the next gyro signal is loaded, the process in connection to the second communication bus becomes free. For example, in this manner, the camera module 10 according to the present embodiment executes the lens shift type OIS process.

As in Patent document 1, when the first OIS driver and the second OIS driver have a slave connection with the OIS controller, and the OIS controller centrally controls the two OIS drivers alone, the load on the OIS controller increases. In addition, communication time and calculation time for correction becomes longer, and communication buses between the OIS controller and each OIS driver become pressured. Meanwhile, in the camera module 10 according to the present embodiment, the first driver 200 has a slave connection in relation to the controller 100, and the second driver 300 has a slave connection in relation to the first driver 200. The first driver 200 is also for performing a function as a sub-controller. In this way, according to the camera module 10 according to the present embodiment, it is possible to mitigate the processing load in the controller 100, such as making a correcting calculation in the controller 100 not required. In addition, according to the camera module 10 according to the present embodiment, in addition to making communication for a correcting calculation in the first communication bus not required, it is possible to reduce the communication amount for a correcting calculation also in the second communication bus. Accordingly, according to the camera module 10 according to the present embodiment, since it is possible to increase the communication amount that can be handled in the first communication bus and the second communication bus, it is possible to further aim for high performance, and it allows for extensions such as increasing the number of devices that can be handled by the controller 100 or the like.

Figure 6:
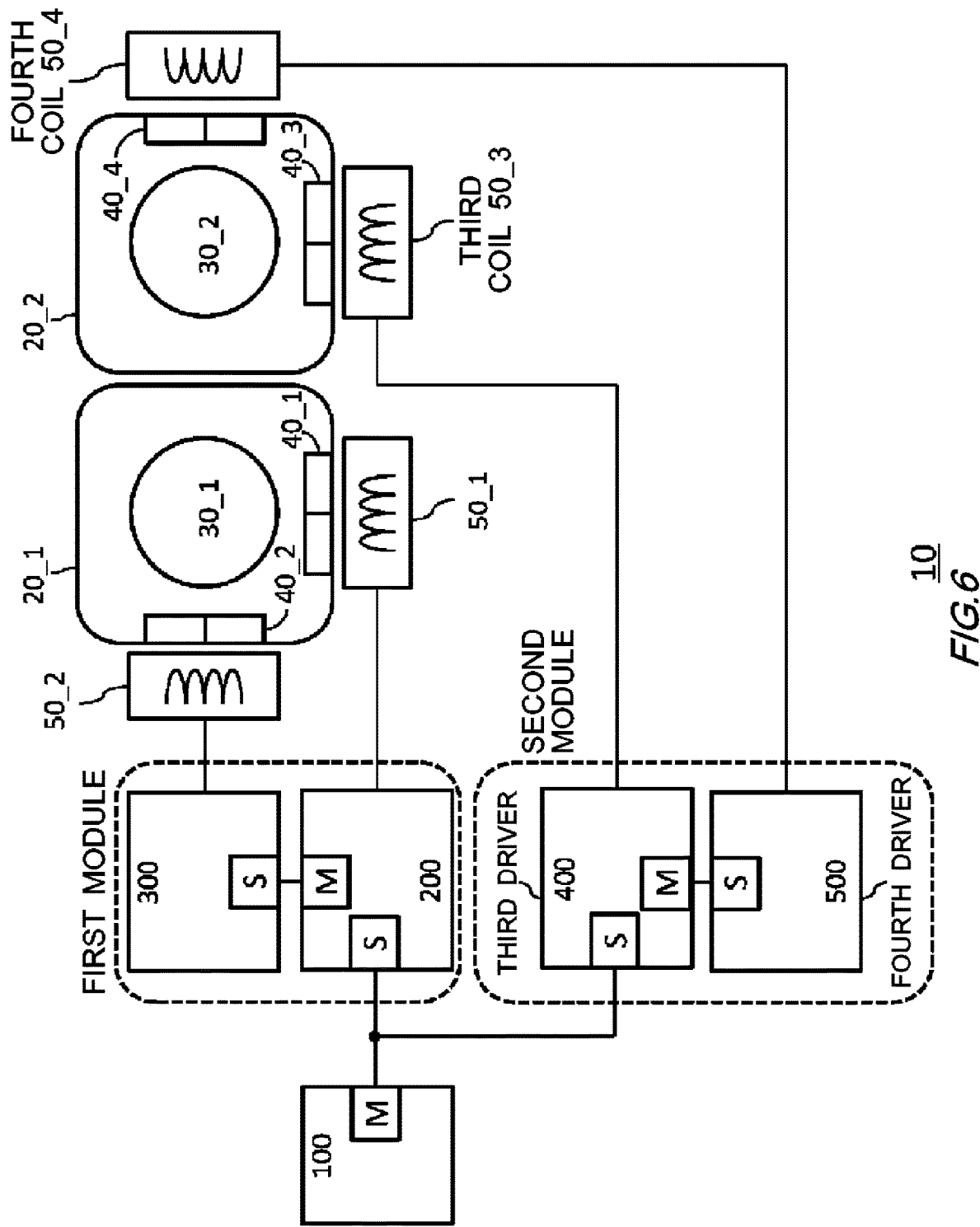
FIG. 6 shows an example of a block diagram of the camera module 10 according to a second embodiment.

FIG. 6 shows an example of a block diagram of the camera module 10 according to a second embodiment. The camera module 10 according to the present embodiment executes a plurality of lens shift type OIS processes. In the present drawing, the same signs are designated in relation to members having the same functions and configurations as those in FIG. 1, and the description thereof will be omitted except for the following differences. Herein, for convenience of explanation, in FIG. 1, the "object 20" is referred to as a "first object 20_1" and the "lens 30" is referred to as a "first lens 30_1". The camera module 10 according to the present embodiment further includes a second object 20_2, a third coil 50_3 and a fourth coil 504, a third driver 400, and a fourth driver 500. In the present embodiment, the first driver 200 and the second driver 300 configure a first module, and the third driver 400 and the fourth driver 500 configure a second module.

The second object 20_2 may be similar to the first object 20_1. The second object 20_2 is provided with a second lens 30_2, a third magnet 40_3, and a fourth magnet 40_4. The second lens 30_2 may be similar to the first lens 30_1. The third magnet 40_3 and the fourth magnet 40_4 may respectively be similar to the first magnet 40_1 and the second magnet 40_2.

The third coil 50_3 and the fourth coil 50_4 may respectively be similar to the first coil 50_1 and the second coil 50_2.

In the present embodiment, the controller 100, in addition to the first driver 200, also has a master connection in relation to the third driver 400, and outputs a generated third position control signal to the third driver 400.

The third driver 400 may be similar to the first driver 200. That is, the third driver 400 has a slave connection in relation to the controller 100, and supplies a driving current to the third coil 50_3 based on the third position control signal output from the controller 100. In addition, the third driver 400 is also for performing a function as a sub-controller. That is, the third driver 400 has a master connection in relation to the fourth driver 500, and outputs a generated fourth position control signal to the fourth driver 500.

The fourth driver 500 may be similar to the second driver 300. That is, the fourth driver 500 has a slave connection in relation to the third driver 400, and supplies a driving current to the fourth coil 50_4 based on the fourth position control signal output from the third driver 400.

In the present embodiment, the first driver 200 is also for performing a function as a sub-controller of the first module, and the third driver 400 is also for performing a function as a sub-controller of the second module. In this way, the camera module 10 according to the present embodiment executes a plurality of lens shift type OIS processes.

Figure 7:
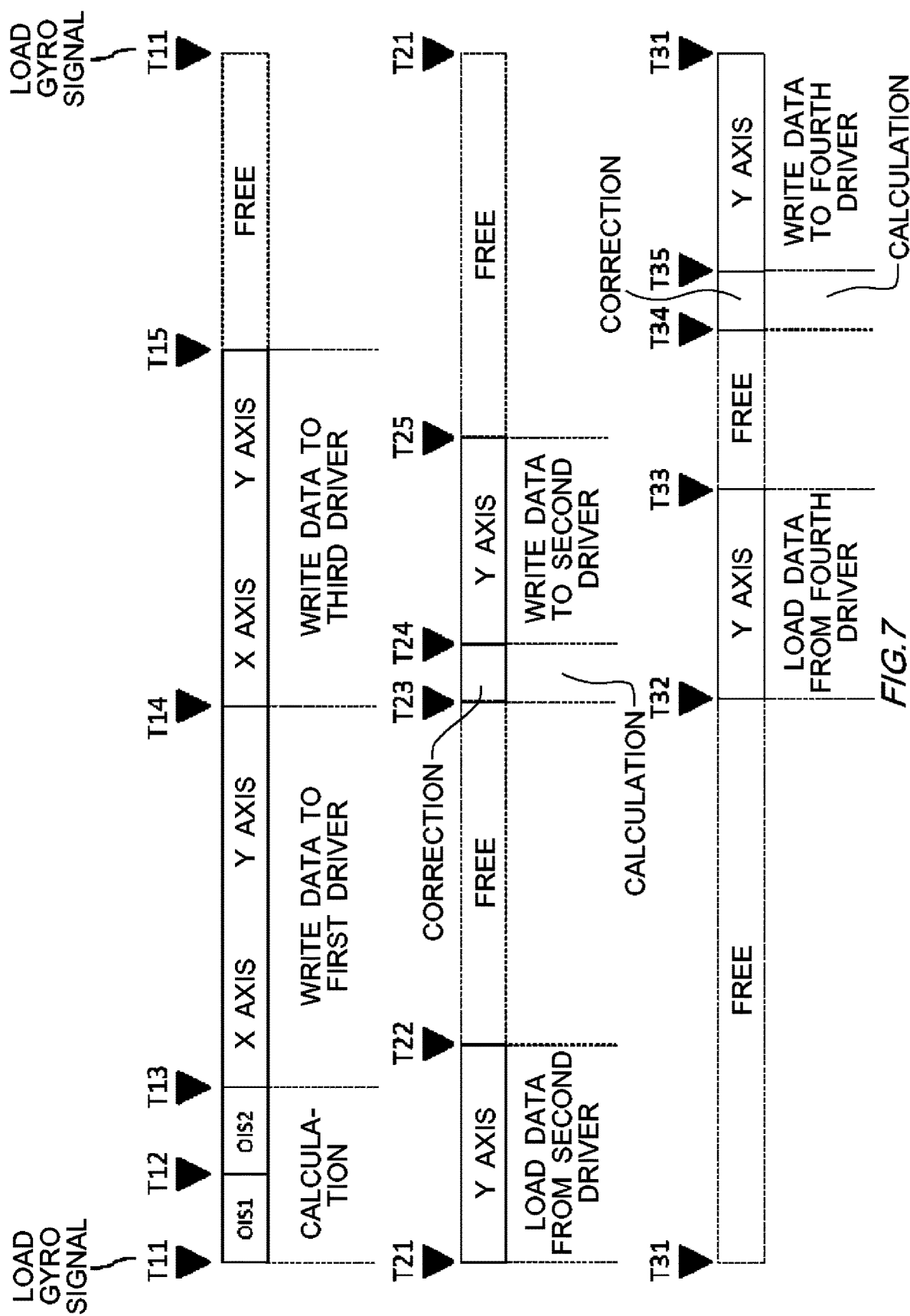
FIG. 7 shows an example of a timing diagram of the camera module 10 according to the second embodiment.

FIG. 7 shows an example of a timing diagram of the camera module 10 according to the second embodiment. The upper part of the present drawing shows a process in connection to a first communication bus in between the controller 100 and the first driver 200 and the third driver 400. The middle part of the present drawing shows a process in connection to a second communication bus in between the first driver 200 and the second driver 300. The lower part of the present drawing shows a process in connection to a third communication bus in between the third driver 400 and the fourth driver 500. In addition, in the present drawing, the horizontal axis indicates time.

First, focusing on the process in connection to the first communication bus (the upper part of the present drawing), in the period from time T11 to T12, an OIS (OIS 1) calculation of the first module is executed. In the period from time T12 to T13, an OIS (OIS 2) calculation of the second module is executed. In the period from time T13 to T14, a writing process of data (the target position of the x axis direction and the y axis direction regarding the first module) to the first driver 200 is executed. In the period from time T14 to T15, a writing process of data (the target position of the x axis direction and the y axis direction regarding the second module) to the third driver 400 is executed. From time T15 and later, until the next gyro signal is loaded, the process in connection to the first communication bus becomes free.

The process in connection to the second communication bus (the middle part of the present drawing) may be similar to that in the first embodiment (the lower part of FIG. 5), so its description is omitted herein.

Then, focusing on the process in connection to the third communication bus (the lower part of the present drawing), in the period from time T31 (=time T11) to time T32 (=time T23), the process in connection to the third communication bus becomes free. In the period from time T32 to T33, a loading process of data (the detection position of the y axis direction regarding the second module) from the fourth driver 500 is executed. From time T33 and later, until time T34 (=time T15) when the writing process of data to the third driver 400 ends, the process in connection to the third communication bus becomes free. It is noted that at any time until time T34, the third driver 400 may detect the position of the second object 20_2 and make the third position signal indicating the detected position of the second object 20_2 in a state in which it is available. In the period from time T34 to T35, a correcting calculation of the second module is executed. In the period from time T35 to T31, a writing process of data (the target position of the y axis direction regarding the second module) to the fourth driver 500 is executed. For example, in this manner, the camera module 10 according to the present embodiment executes a plurality of lens shift type OIS processes.

In this manner, in the camera module 10 according to the present embodiment, the first driver 200 and the third driver 400 have a slave connection in relation to the controller 100. Respectively, the second driver 300 has a slave connection in relation to the first driver 200, and the fourth driver 500 has a slave connection in relation to the third driver 400. The first driver 200 is also for performing a function as a sub-controller in the first module, and the third driver 400 is also for performing a function as a sub-controller in the second module. In this way, according to the camera module 10 according to the present embodiment, since it is possible to increase the number of modules that can be controlled by the controller 100, it is possible to execute a plurality of OIS processes in the cycle of loading the gyro signal.

Figure 8:
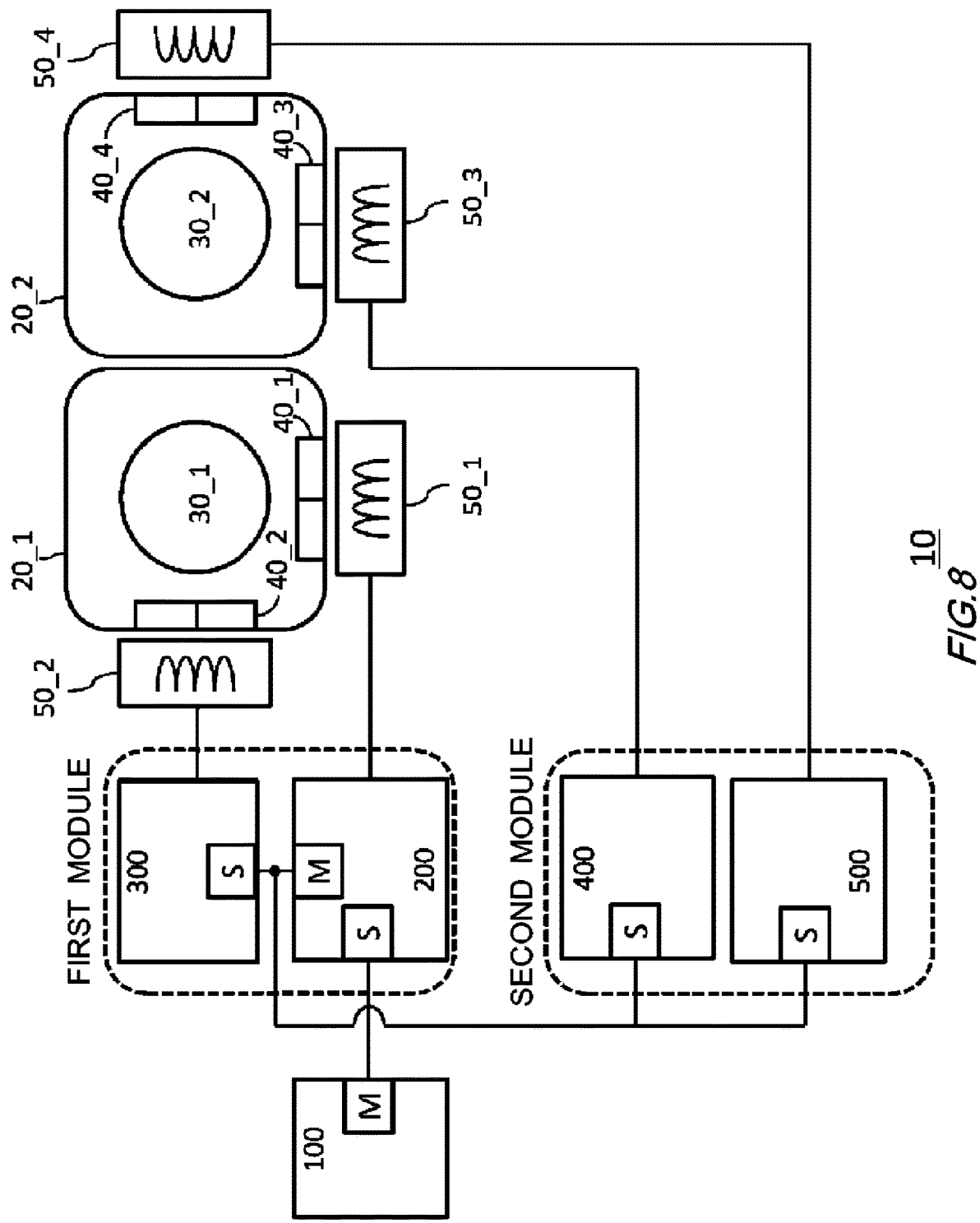
FIG. 8 shows an example of a block diagram of the camera module 10 according to a third embodiment.

FIG. 8 shows an example of a block diagram of the camera module 10 according to a third embodiment. The camera module 10 according to the present embodiment, similarly to the camera module 10 according to the second embodiment, executes a plurality of lens shift type OIS processes. In the present drawing, the same signs are designated in relation to members having the same functions and configurations as those in FIG. 6, and the description thereof will be omitted except for the following differences.

In the present embodiment, the third driver 400 may be similar to the second driver 300 and the fourth driver 500. That is, the controller 100 may have a master connection only in relation to the first driver 200. The third driver 400 may have a slave connection in relation to the first driver 200, similarly to the second driver 300 and the fourth driver 500.

In the present embodiment, the first driver 200 is also for performing a function as a common sub-controller of the first module and the second module. In this way, the camera module 10 according to the present embodiment executes a plurality of lens shift type OIS processes.

Figure 9:
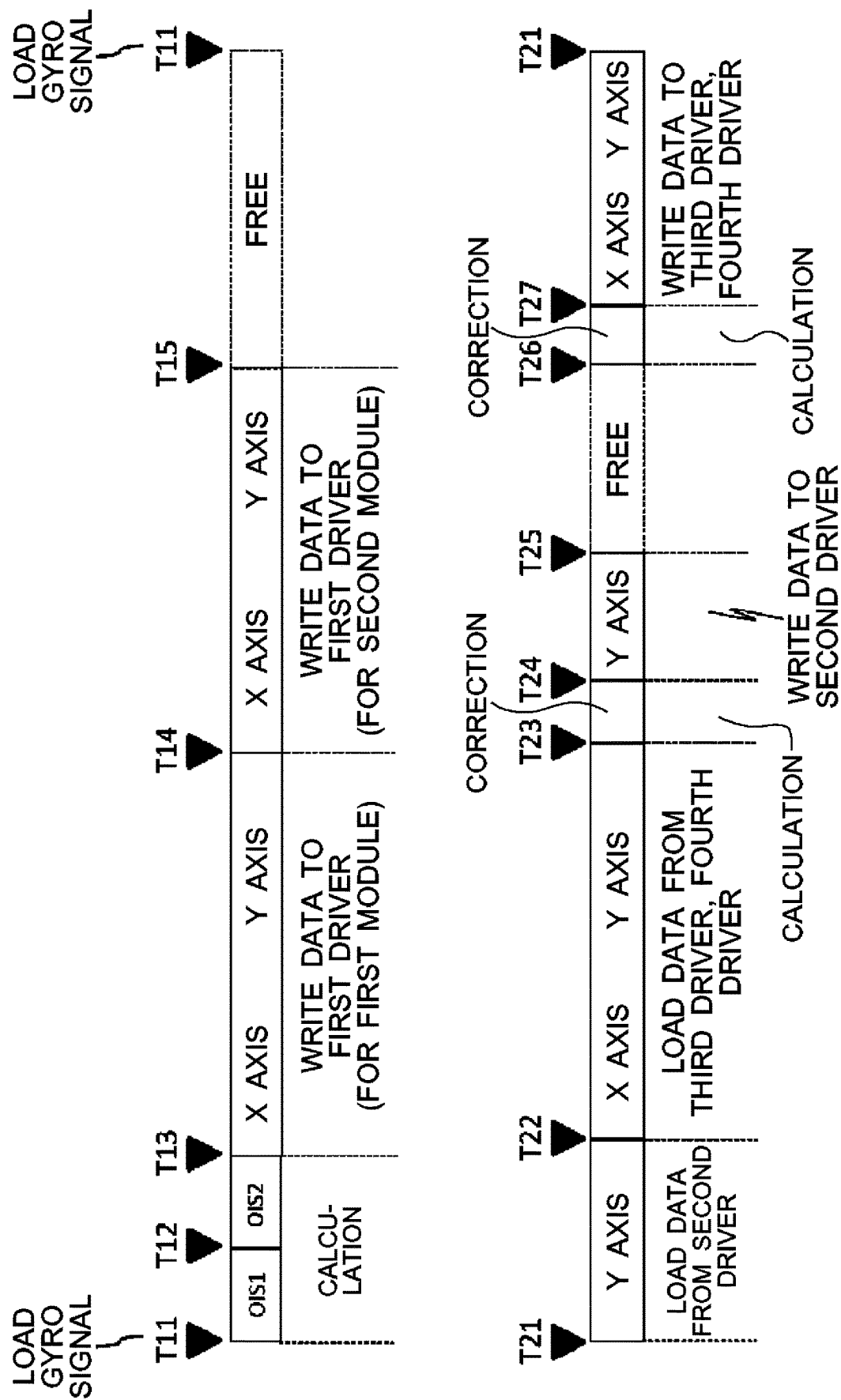
FIG. 9 shows an example of a timing diagram of the camera module 10 according to the third embodiment.

FIG. 9 shows an example of a timing diagram of the camera module 10 according to the third embodiment. The upper part of the present drawing shows a process in connection to the first communication bus in between the controller 100 and the first driver 200. The lower part of the present drawing shows a process in connection to a second communication bus in between the first driver 200, the second driver 300, the third driver 400, and the fourth driver 500. In addition, in the present drawing, the horizontal axis indicates time.

First, focusing on the process in connection to the first communication bus (the upper part of the present drawing), since, except for the point that, in the period from time T14 to T15, a writing process on data (the target position of the x axis direction and the y axis direction regarding the second module) is executed in relation to the third driver 400 instead of being executed in relation to the first driver 200, it may be similar to that the second embodiment (upper part of FIG. 7), its description will be omitted herein.

Then, focusing on the process in connection to the second communication bus (the lower part of the present drawing), in the period from time T21 to T22, a loading process of data (the detection position of the y axis direction regarding the first module) from the second driver 300 is executed. In the period from time T22 to T23, a loading process of data (the detection position of the x axis direction and the y axis direction regarding the second module) from the third driver 400 and the fourth driver 500 is executed. It is noted that the first driver 200, at any time until time T23, may detect the position of the first object 20_1 and make the first position signal indicating the detected position of the first object 20_1 in a state in which it is available. In the period from time T23 to T24, a correcting calculation of the first module is executed. In the period from time T24 to T25, a writing process of data (the target position of the y axis direction regarding the first module) to the second driver 300 is executed. From time T25 and later, until time T26 (=time T15) when the writing process of data regarding the second module to the first driver 200 ends, the process in connection to the second communication bus becomes free. In the period from time T26 to T27, a correcting calculation of the second module is executed. In the period from time T27 to T21, a writing process of data (the target position of the x axis direction and the y axis direction regarding the second module) to the third driver 400 and the fourth driver 500 is executed. For example, in this manner, the camera module 10 according to the present embodiment executes a plurality of lens shift type OIS processes.

In this manner, in the camera module 10 according to the present embodiment, in executing a plurality of OIS processes, the first driver 200 is also for performing a function as a common sub-controller of the first module and the second module. In this way, according to the camera module 10 according to the present embodiment, it is possible to reduce the number of drivers that are also for performing a function as a sub-controller.

It is noted that, in the description, a case where the camera module 10 executes the lens shift type OIS process as an example, but it is not limited to this. The camera module 10 may execute various types of OIS processes.

Figure 10:
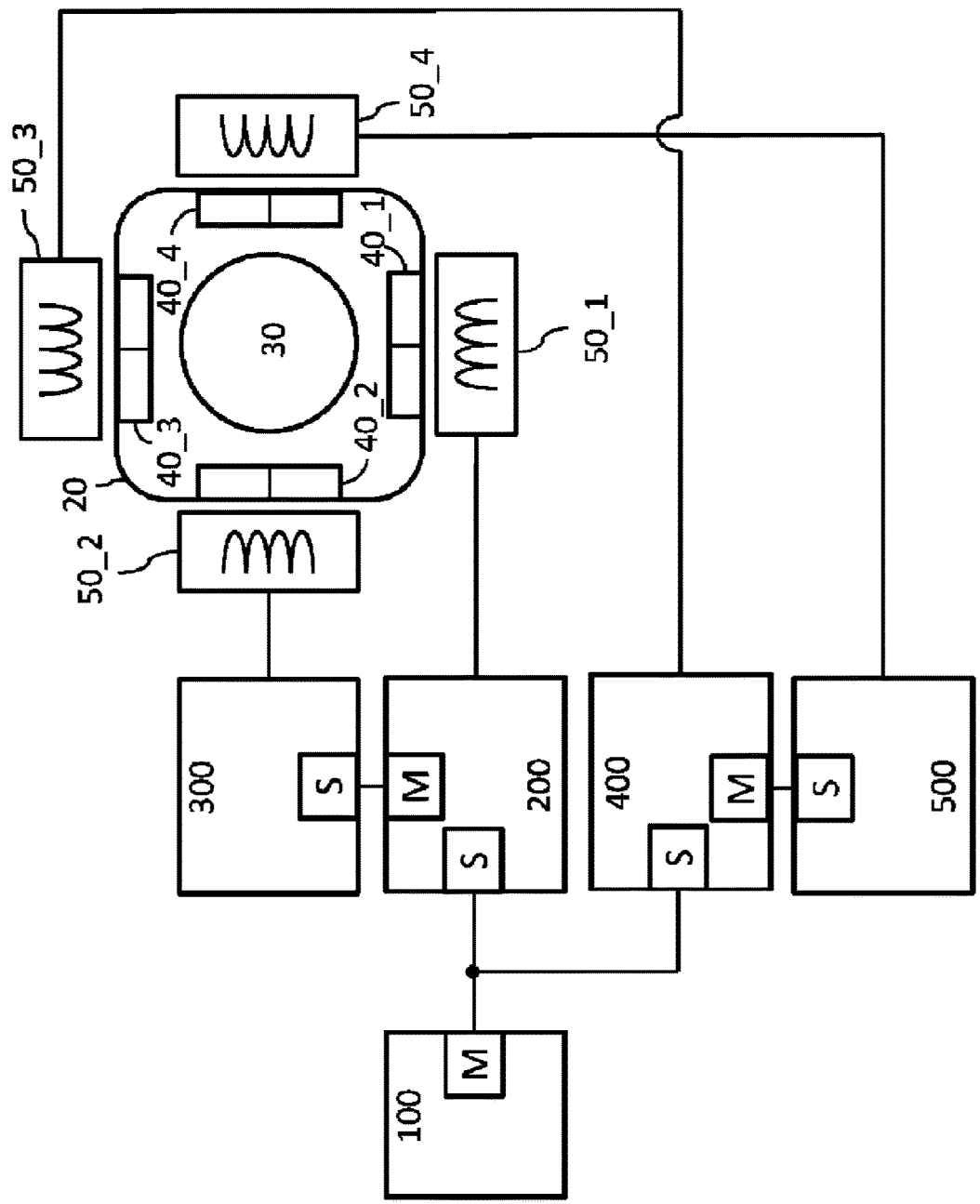
FIG. 10 shows an example of a block diagram of the camera module 10 according to a fourth embodiment.

FIG. 10 shows an example of a block diagram of the camera module 10 according to a fourth embodiment. The camera module 10 according to the present embodiment executes a sensor shift type OIS process. In the sensor shift type OIS process, by moving the object 20 and shifting an image sensor (imaging element), the optical axis is maintained in the center portion of the image to mitigate video distortion due to camera shake. That is, the first position control unit 130 may generate a first position control signal indicating a first target position to which the object 20 provided with the image sensor or the lens 30 is to be moved. In the present drawing, the same signs are designated in relation to members having the same functions and configurations as those in FIG. 6, and the description thereof will be omitted except for the following differences. Herein, for convenience of explanation, in FIG. 6, the "first object 20_1" is referred to as the "object 20", and the "first lens 30_1" is referred to as the "lens 30". In the present embodiment, the third magnet 40_3 and the fourth magnet 40_4 are provided on the same object 20 as the first magnet 40_1 and the second magnet 40_2. That is, in the present embodiment, four of the magnets 40 are provided on one of the object 20.

In the camera module 10 according to the present embodiment, the first driver 200 and the third driver 400 are also for performing functions as sub-controllers, and the first driver 200 to the fourth driver 500 are used to provide driving forces from four directions to the object 20, thereby executing the sensor shift type OIS process.

Figure 11:
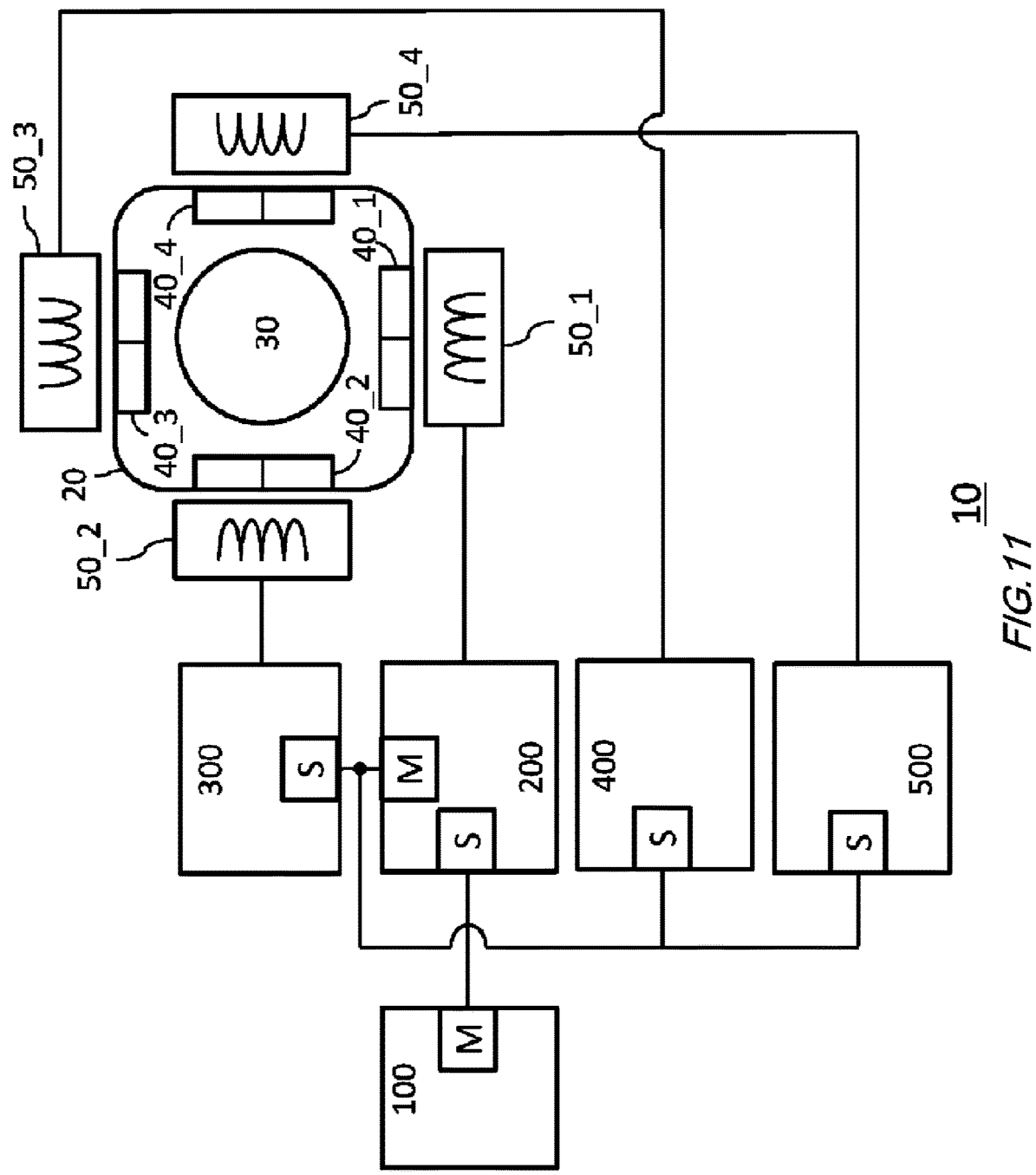
FIG. 11 shows an example of a block diagram of the camera module 10 according to a fifth embodiment.

FIG. 11 shows an example of a block diagram of the camera module 10 according to a fifth embodiment. The camera module 10 according to the present embodiment, similarly to the camera module 10 according to the fourth embodiment, executes a sensor shift type OIS process. In the present drawing, the same signs are designated in relation to members having the same functions and configurations as those in FIG. 10, and the description thereof will be omitted except for the following differences.

In the present embodiment, the third driver 400 may be similar to the second driver 300 and the fourth driver 500. That is, the controller 100 may have a master connection only in relation to the first driver 200. The third driver 400 may have a slave connection in relation to the first driver 200, similarly to the second driver 300 and the fourth driver 500.

In the camera module 10 according to the present embodiment, the first driver 200 is also for performing a function as a common sub-controller, and the first driver 200 to the fourth driver 500 are used to provide driving forces from four directions to the object 20, thereby executing the sensor shift type OIS process.

Figure 12:
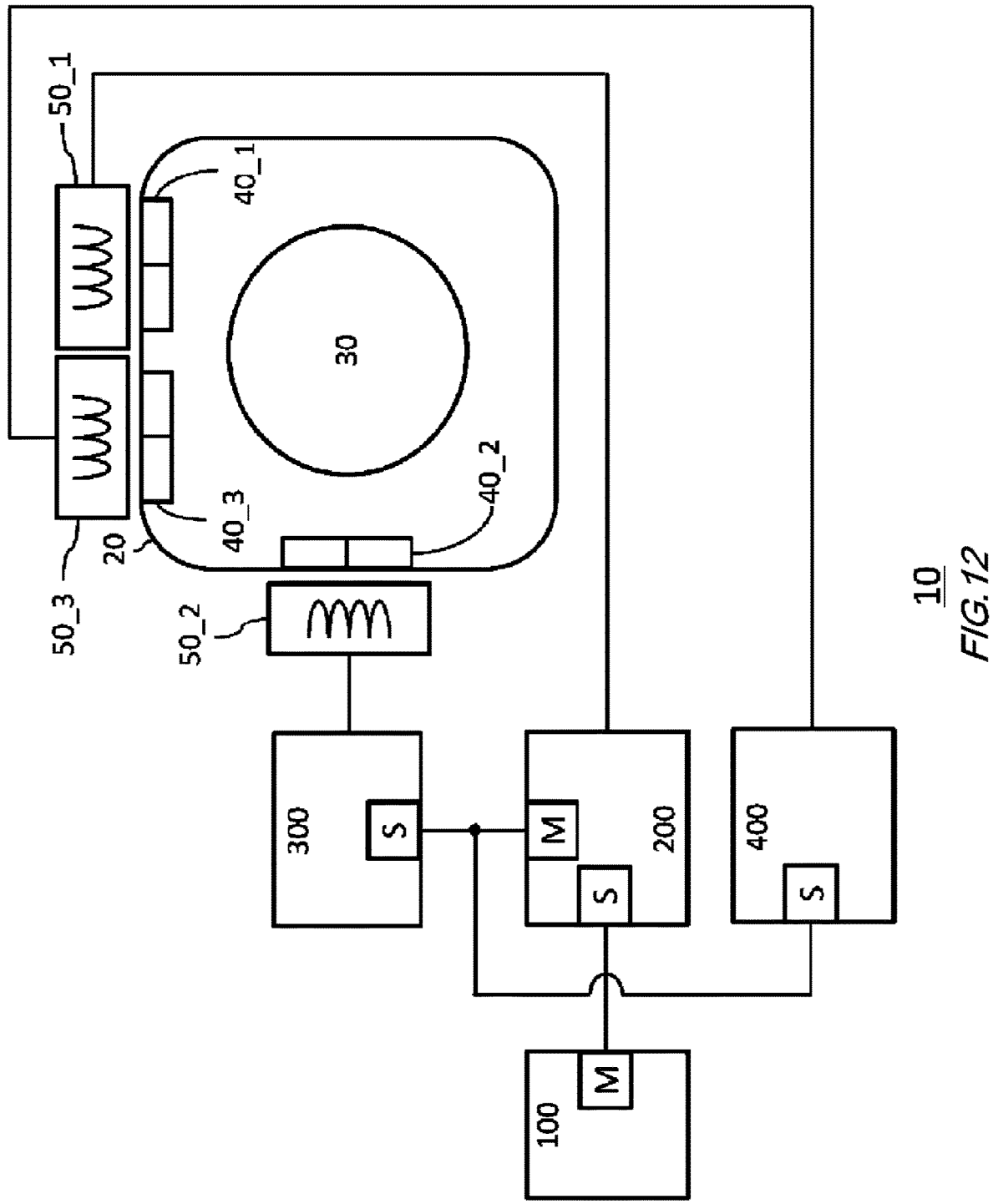
FIG. 12 shows an example of a block diagram of the camera module 10 according to a sixth embodiment.

FIG. 12 shows an example of a block diagram of the camera module 10 according to a sixth embodiment. The camera module 10 according to the present embodiment, similarly to the camera module 10 according to the fifth embodiment, executes a sensor shift type OIS process. In the present drawing, the same signs are designated in relation to members having the same functions and configurations as those in FIG. 11, and the description thereof will be omitted except for the following differences.

In the present embodiment, the object 20 is provided with the lens 30, the first magnet 40_1, the second magnet 40_2, and the third magnet 40_3. The third magnet 403 is provided on the same side as the side in the object 20 on which the first magnet 401 is provided.

In the camera module 10 according to the present embodiment, the first driver 200 is also for performing a function as a common sub-controller, and the first driver 200 to the third driver 400 are used to provide one driving force from a first direction and provide two driving forces from a second direction to the object 20, thereby executing the sensor shift type OIS process.

In this manner, the camera module 10 may execute the sensor shift type OIS process. Herein, a case where the camera module 10 executes the lens shift type OIS process as an example, but it is not limited to this. The camera module 10 may execute an auto focus (AF)/Zoom process.

Figure 13:
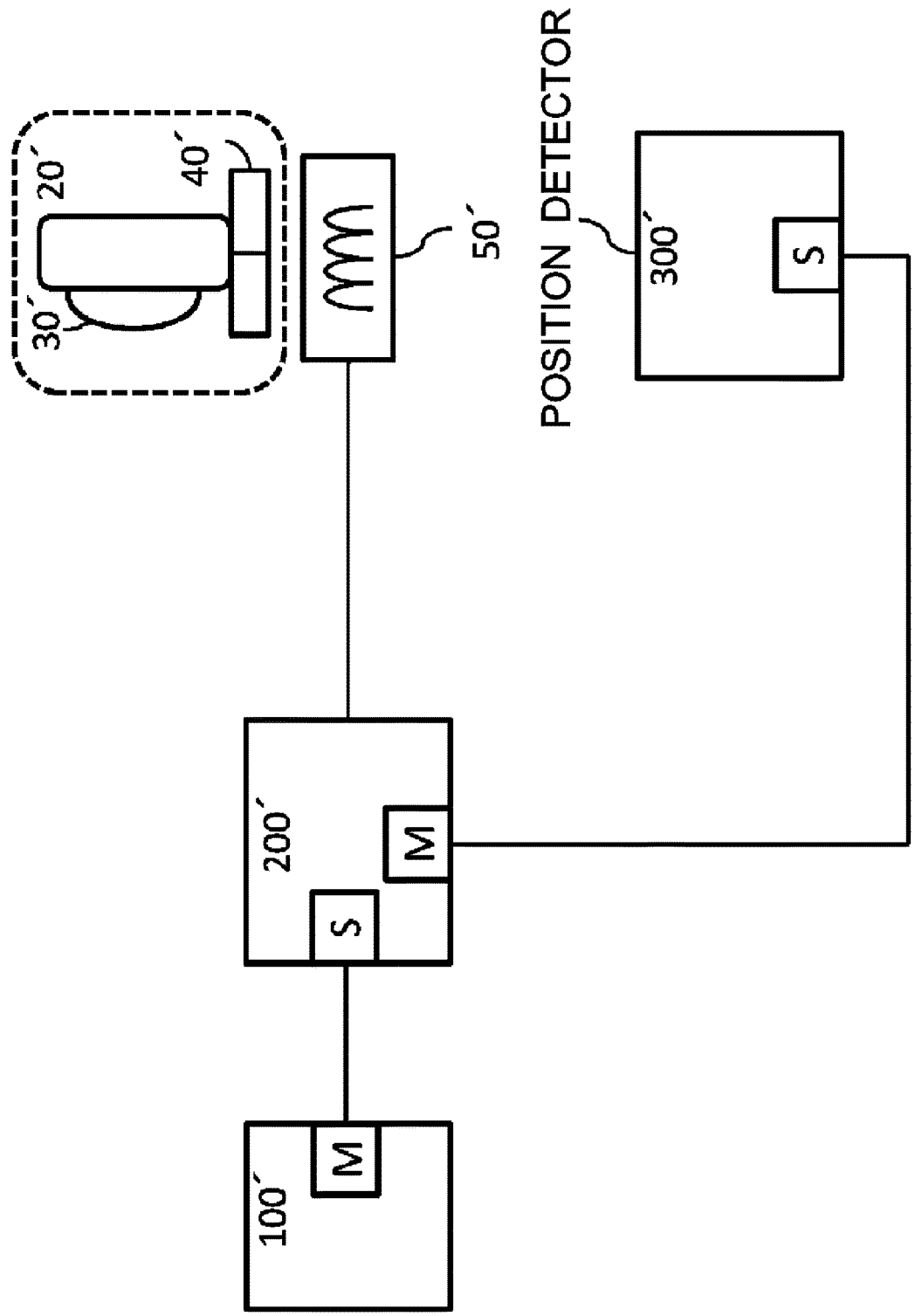
FIG. 13 shows an example of a block diagram of the camera module 10 according to a seventh embodiment.

FIG. 13 shows an example of a block diagram of the camera module 10 according to a seventh embodiment. The camera module 10 according to the present embodiment executes an AF/Zoom process. In the AF/Zoom process, by moving an object along the optical axis direction, focusing and enlargement/reduction is performed.

In the present embodiment, the camera module 10 includes an object 20', a coil 50', a controller 100', a driver 200', and a position detector 300'.

The object 20' is a linear motion device whose position changes along the optical axis direction according to an input signal. The object 20' is provided with a lens 30' and a magnet 40'. The magnet 40' is disposed along the optical axis direction of the lens 30'.

The coil 50' are wound along the optical axis direction of the lens 30' similarly to the magnet 40', nearby the magnet 40'. When a driving current is supplied to such the coil 50', since a magnetic force is generated between the coil 50' and the magnet 40', the object 20' is displaced along the optical axis direction of the lens 30'. In this way, focusing and enlargement/reduction is possible.

The controller 100' is a high-order controller for controlling the AF/Zoom process. In the present embodiment, the controller 100' may be mounted as a part of a function of a host. The controller 100' includes a position control unit 130' and a first master port 140'.

The position control unit 130' generates a position control signal indicating a target position to which the object 20' provided with the lens 30' is to be moved. The position control unit 130' supplies the generated position control signal to the first master port 140'.

The first master port 140' is connected to a slave port in the driver 200'. The first master port 140' outputs the position control signal generated by the position control unit 130' to the driver 200'.

The driver 200' is a driver for providing driving force to the object 20'. In the present embodiment, the driver 200' may be an AF/Zoom driver. The driver 200' has a slave connection in relation to the controller 100', and supplies a driving current to the coil 50' based on the position control signal output from the controller 100'. In addition, the driver 200' is also for performing a function as a sub-controller. That is, the driver 200' has a master connection in relation to the position detector 300', and obtains the position information and corrects the detection position. The driver 200' includes a first slave port 210', a sensor 220', a driving unit 230', a second master port 250', and a calculating unit 260'.

The first slave port 210' is connected to the first master port 140' in the controller 100'. The driver 200' obtains the position control signal from the controller 100' via the said first slave port 210'. The obtained position control signal is supplied to the driving unit 230'.

The sensor 220' detects the position of the object 20'. The sensor 220' supplies a position signal indicating the detected position of the object 20' to the calculating unit 260'.

The driving unit 230' applies driving force to the object 20' based on the position control signal. In this case, the driving unit 230' applies the driving force to the object 20' based on the position information indicating the position of the object 20' detected by the position detector 300' and the position control signal.

The position detector 300' has a slave connection with the second master port 250'. The driver 200' obtains the position information indicating the position of the object 20' detected by the position detector 300' via the said second master port 250'. The obtained position information is supplied to the calculating unit 260'.

The calculating unit 260' corrects the detection position of the object 20' by using the position signal and the position information. In this case, for example, as in Japanese utility model application no. 3189365, the calculating unit 260' may correct the detection position based on a result of dividing the sum of the position signal and the position information by the difference between the position signal and the position information. In addition, for example, as in Japanese patent no. 4612281, the calculating unit 260' may correct the detection position based on a result of dividing the difference of the position signal and the position information by the sum of the position signal and the position information. In addition, the calculating unit 260' may correct the detection position by selectively adopting the position signal in a first interval, and selectively adopting the position information in a second interval. For example, in this manner, the calculating unit 260' supplies information indicating the corrected detection position to the driving unit 230'.

According to this, the driving unit 230' may generate a control signal for moving the detection position to the target position indicated by the position control signal. The driving unit 230' may supply a driving current according to the control signal to the coil 50'. In this manner, the driving unit 230' may provide driving force to the object 20' based on the position signal and position information indicating the position of the object 20' detected by the sensor 220', and the position control signal.

The position detector 300' is an extension device for detecting the position of the object 20'. The position detector 300' has a slave connection in relation to the driver 200', and outputs the position information indicating the detected position of the object 20' to the driver 200'. The position detector 300' includes a second slave port 310' and an extension sensor 320'.

The second slave port 310' is connected to the second master port 250' in the driver 200'. The second slave port 310' outputs the position information indicating the position of the object 20' detected by the extension sensor 320' to the driver 200'.

The extension sensor 320' detects the position of the object 20'. The extension sensor 320' supplies the position information indicating the detected position of the object 20' to the second slave port 310'.

Figure 14:
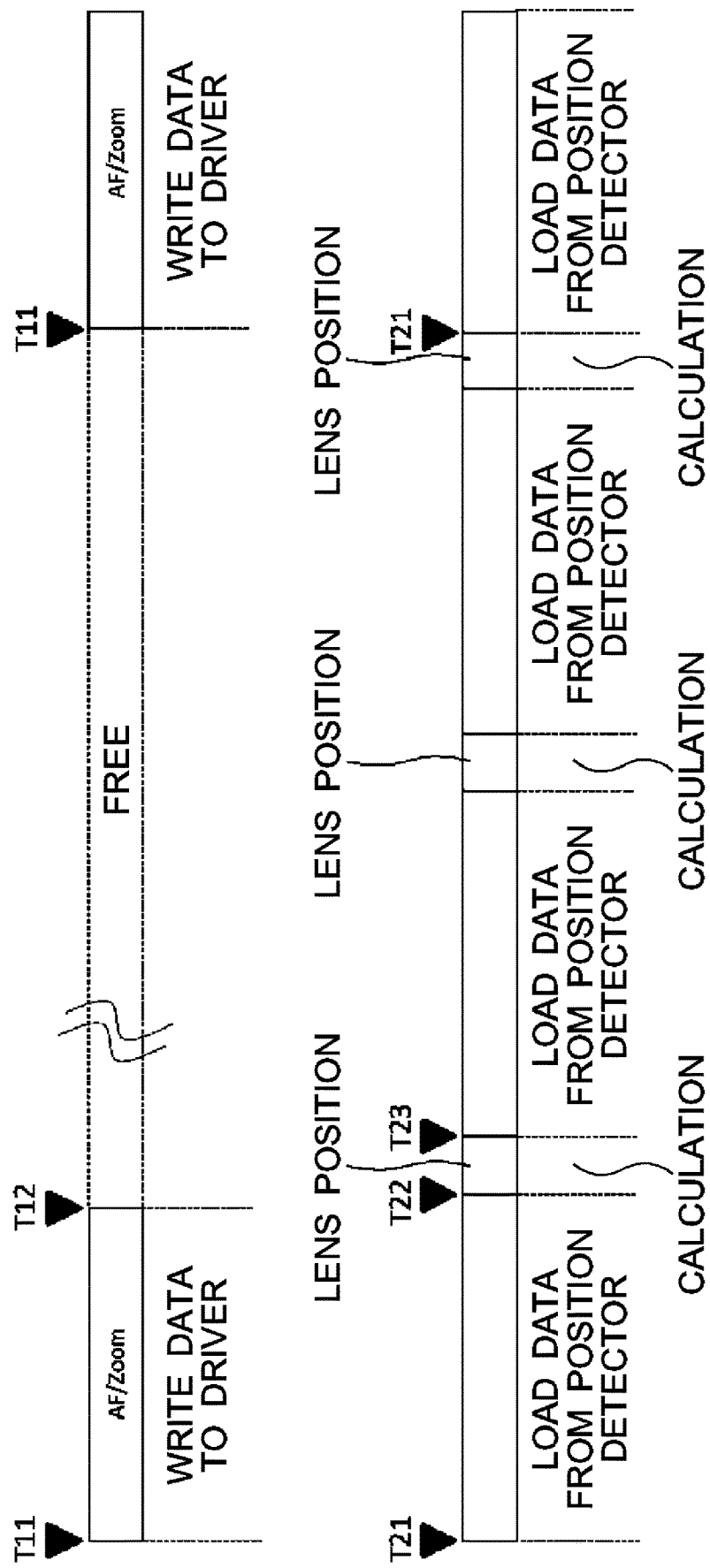
FIG. 14 shows an example of a timing diagram of the camera module 10 according to the seventh embodiment.

FIG. 14 shows an example of a timing diagram of the camera module 10 according to the seventh embodiment. The upper part of the present drawing shows a process in connection to a first communication bus in between the controller 100' and the driver 200'. The lower part of the present drawing shows a process in connection to a second communication bus in between the driver 200' and the position detector 300'. In addition, in the present drawing, the horizontal axis indicates time.

First, focusing on the process in connection to the first communication bus (the upper part of the present drawing), in the period from time T11 to T12, a writing process of data (the target position) to the driver 200' is executed. From time T12 and later, until the writing process of data to the driver 200' is started, the process in connection to the first communication bus becomes free.

Then, focusing on the process in connection to the second communication bus (the lower part of the present drawing), in the period from time T21 (=time T11) to T22, a loading process of data (the position information) from the position detector 300' is executed. It is noted that the driver 200', at any time until time T22, may detect the position of the object 20' and make the position signal indicating the detected position of the object 20' in a state in which it is available. In the period from time T22 to T23, a lens position calculation is executed. That is, the calculating unit 260' corrects the detection position of the object 20' by using the position signal and the position information. The calculating unit 260' supplies information indicating the corrected detection position to the driving unit 230'. According to this, the driving unit 230' may generate a control signal for moving the detection position to the target position indicated by the position control signal. The driving unit 230' may supply a driving current according to the control signal to the coil 50'. From time T23 and later, until a next writing process to the driver 200' is started, the process from time T21 to time T23 may be executed repeatedly. For example, in this manner, the camera module 10 according to the present embodiment executes the AF/Zoom process.

In this manner, in the camera module 10 according to the present embodiment, the driver 200' has a slave connection in relation to the controller 100', and the position detector 300' has a slave connection in relation to the driver 200'. The driver 200' is also for performing a function as a sub-controller. In this way, according to the camera module 10 according to the present embodiment, it is possible to mitigate the processing load in the controller 100', such as that the lens position calculation in the controller 100' is not required. In addition, according to the camera module 10 according to the present embodiment, communication for the lens position calculation in the first communication bus is not required. Accordingly, according to the camera module 10 according to the present embodiment, since it is possible to increase the communication amount that can be handled in the communication buses, it is possible to further aim for high performance, and it allows for extensions such as increasing the number of devices that can be handled by the controller 100' or the like.

Figure 15:
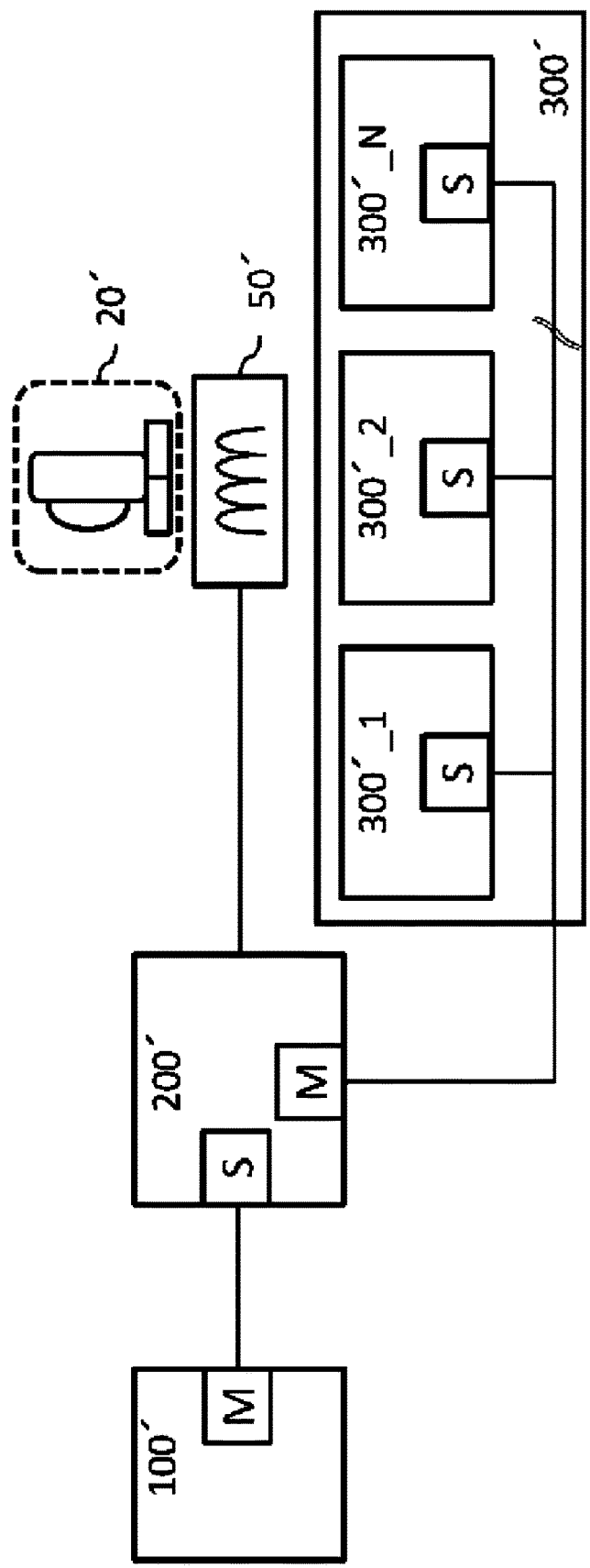
FIG. 15 shows an example of a block diagram of the camera module 10 according to an eighth embodiment.

FIG. 15 shows an example of a block diagram of the camera module 10 according to an eighth embodiment. The camera module 10 according to the present embodiment, similarly to the camera module 10 according to the seventh embodiment, executes an AF/Zoom process. In the present drawing, the same signs are designated in relation to members having the same functions and configurations as those in FIG. 13, and the description thereof will be omitted except for the following differences.

In the present embodiment, the position detector 300' is configured by a position detecting element group made up of a plurality of position detecting elements. The present drawing shows an example of when the position detector 300' is configured by a position detecting element group made up of a first position detecting element 300'_1, a second position detecting element 300'_2, ..., and a Nth position detecting element 300'_N.

The first position detecting element 300'_1, the second position detecting element 300'_2, ..., and the Nth position detecting element 300'_N each include the extension sensor 320' for detecting the position of the object 20', and the second slave port 310' connected to the second master port 250' in the driver 200'.

Figure 16:
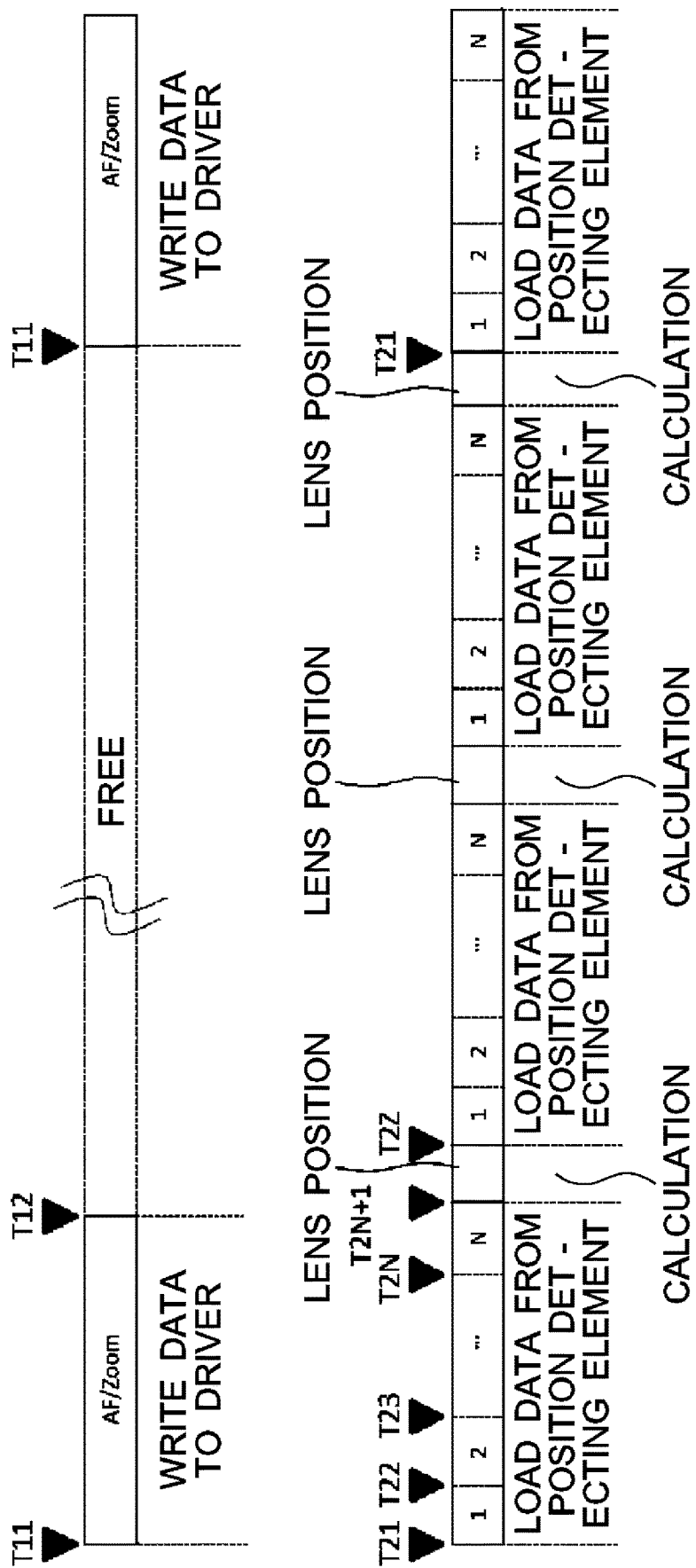
FIG. 16 shows an example of a timing diagram of the camera module 10 according to the eighth embodiment.

FIG. 16 shows an example of a timing diagram of the camera module 10 according to the eighth embodiment. The upper part of the present drawing shows a process in connection to a first communication bus in between the controller 100' and the driver 200'.

The lower part of the present drawing shows a process in connection to a second communication bus in between the driver 200' and the first position detecting element 300'_1, the second position detecting element 300'_2, ..., and the Nth position detecting element 300'_N. In addition, in the present drawing, the horizontal axis indicates time.

The process in connection to the first communication bus (the upper part of the present drawing) may be similar to that in the seventh embodiment (the upper part of FIG. 14), so its description is omitted herein.

Then, focusing on the process in connection to the second communication bus (the lower part of the present drawing), in the period from time T21 (=time T11) to T22, a loading process of data (the position information) from the first position detecting element 300'_1 is executed. Similarly, in the period from time T22 to T23, a loading process of data (the position information) from the second position detecting element 300'_2 is executed.

Similarly, in the period from time T2N to T2N+a, a loading process of data (the position information) from the Nth position detecting element 300'_N is executed. In the period from time T2N+1 to T2Z, a lens position calculation is executed. From time T2Z and later, until a next writing process to the driver 200' is started, the process from time T21 to time T2Z may be executed repeatedly. For example, in this manner, the camera module 10 according to the present embodiment executes the AF/Zoom process.

In general, when controlling the object 20' by an AF/Zoom process over a long distance, a case is possible where the detectable distance is insufficient with just the sensor mounted to the AF/Zoom driver and an extension of the sensor is required. In the camera module 10 according to the present embodiment, the driver 200' has a slave connection to the controller 100', and the plurality of the position detecting elements 300'_1 to 300'_N each has a slave connection in relation to the driver 200'. The driver 200' is also for performing a function as a sub-controller. In this way, according to the camera module 10 according to the present embodiment, since it is possible to extend the detectable distance, the object 20' can be controlled over a long distance. In addition, since communication for the lens position calculation in the first communication bus is not required even in this case, it allows for extensions such as increasing the number of devices that can be handled by the controller 100' or the like. That is, according to the camera module 10 according to the present embodiment, it is also possible to connect a plurality of systems made up of the object 20', the coil 50', the driver 200', and the position detector 300' to the controller 100', and execute a distributed process of a plurality of cameras.

Figure 17:
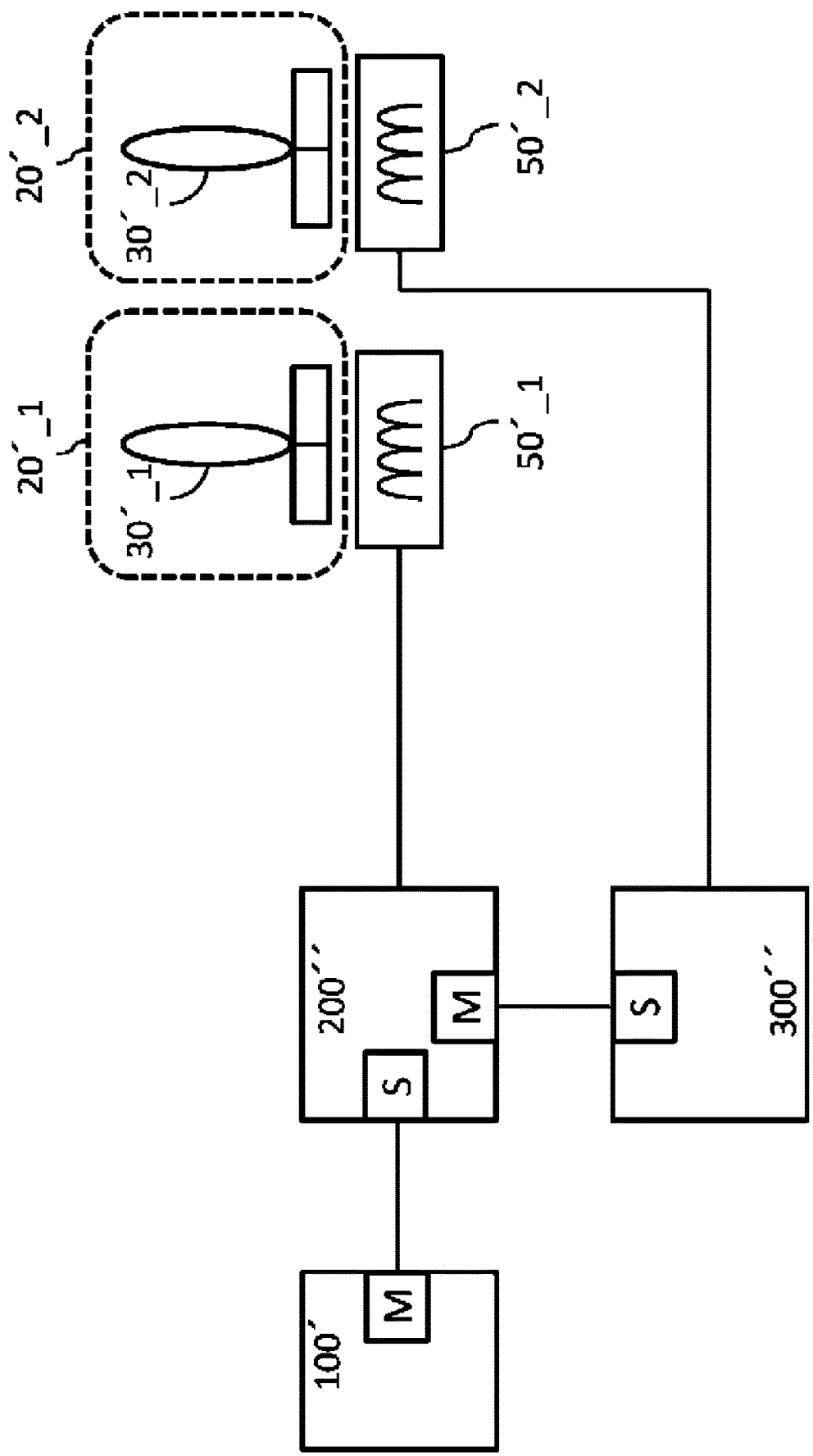
FIG. 17 shows an example of a block diagram of the camera module 10 according to a ninth embodiment.

FIG. 17 shows an example of a block diagram of the camera module 10 according to a ninth embodiment. The camera module 10 according to the present embodiment executes an AF/Zoom tracking process. In the present drawing, the same signs are designated in relation to members having the same functions and configurations as those in FIG. 13, and the description thereof will be omitted except for the following differences. Herein, for convenience of explanation, in FIG. 15, the "object 20'" is referred to as a "first object 20'_1" and the "coil 50'" is referred to as a "first coil 50'_1". The camera module 10 according to the present embodiment further includes a second object 20'_2 and a second coil 50'_2.

The second object 20'_2 may be similar to the first object 20'_1. The second coil 50'_2 may be similar to the first coil 50'_1.

A first driver 200'' is a driver for driving the first object 20'_1 provided with a first lens 30'_1 along an optical axis direction of the first lens 30'_1. In the present embodiment, the first driver 200'' may be one of a Zoom driver or an AF driver.

A second driver 300'' is a driver for driving the second object 20'_2 provided with a second lens 30'_2 in an optical axis direction of the second lens 30'_2. In the present embodiment, the second driver 300'' may be the other one of the Zoom driver or the AF driver.

In such a case, a calculating unit 260'' including the first driver 200'' may correct at least any of a first position control signal, a first position signal, and a second position control signal in such a way so that the first object 20'_1 and the second object 20'_2 interlock.

Figure 18:
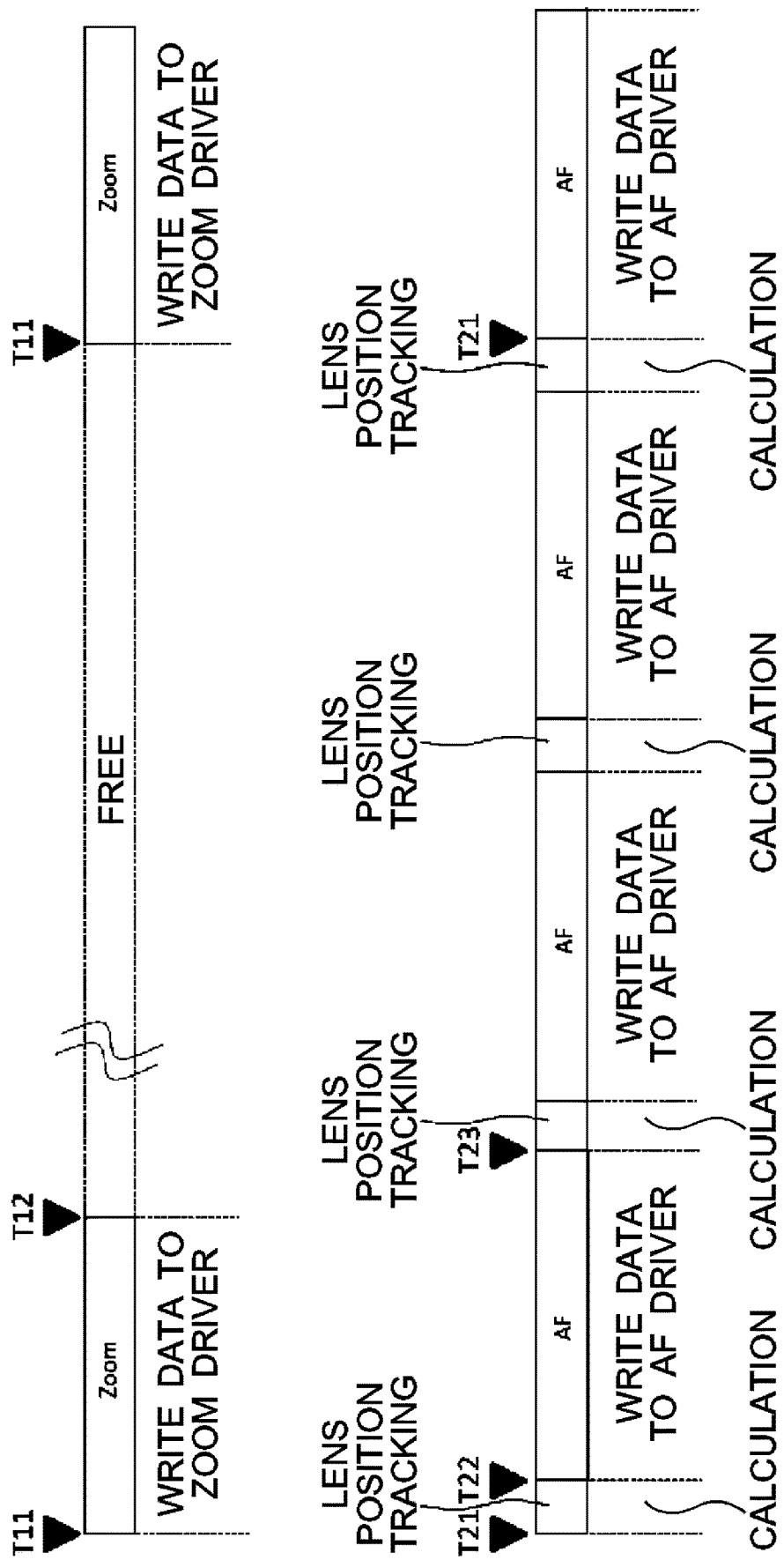
FIG. 18 shows a first example of a timing diagram of the camera module 10 according to the ninth embodiment.

FIG. 18 shows a first example of a timing diagram of the camera module 10 according to the ninth embodiment. The present drawing shows a case where the first driver 200'' is a Zoom driver and the second driver 300'' is an AF driver. The upper part of the present drawing shows a process in connection to a first communication bus in between the controller 100' and the first driver 200''. The lower part of the present drawing shows a process in connection to a second communication bus in between the first driver 200'' and the second driver 300''. In addition, in the present drawing, the horizontal axis indicates time.

First, focusing on the process in connection to the first communication bus (the upper part of the present drawing), in the period from time T11 to T12, a writing process of data (the target position) to the first driver 200'', that is, the Zoom driver, is executed. From time T12 and later, until a next writing process of data to the Zoom driver is started, the process in connection to the first communication bus becomes free.

Then, focusing on the process in connection to the second communication bus (the lower part of the present drawing), in the period from time T21 (=time T11) to T22, a lens position tracking calculation is executed. That is, the calculating unit 260'' may calculate an AF lens position along a tracking curve based on a detection position by a sensor on the Zoom driver side. Such a calculation is known, so its description is omitted herein. In the period from time T22 to T23, a writing process of data (the lens position) to the second driver 300'', that is, the AF driver is executed. From time T23 and later, until a next writing process to the Zoom driver is started, the process in the period from time T21 to T23 is executed repeatedly. For example, in this manner, the camera module 10 according to the present embodiment executes the AF/Zoom tracking process with the Zoom driver as a master.

Figure 19:
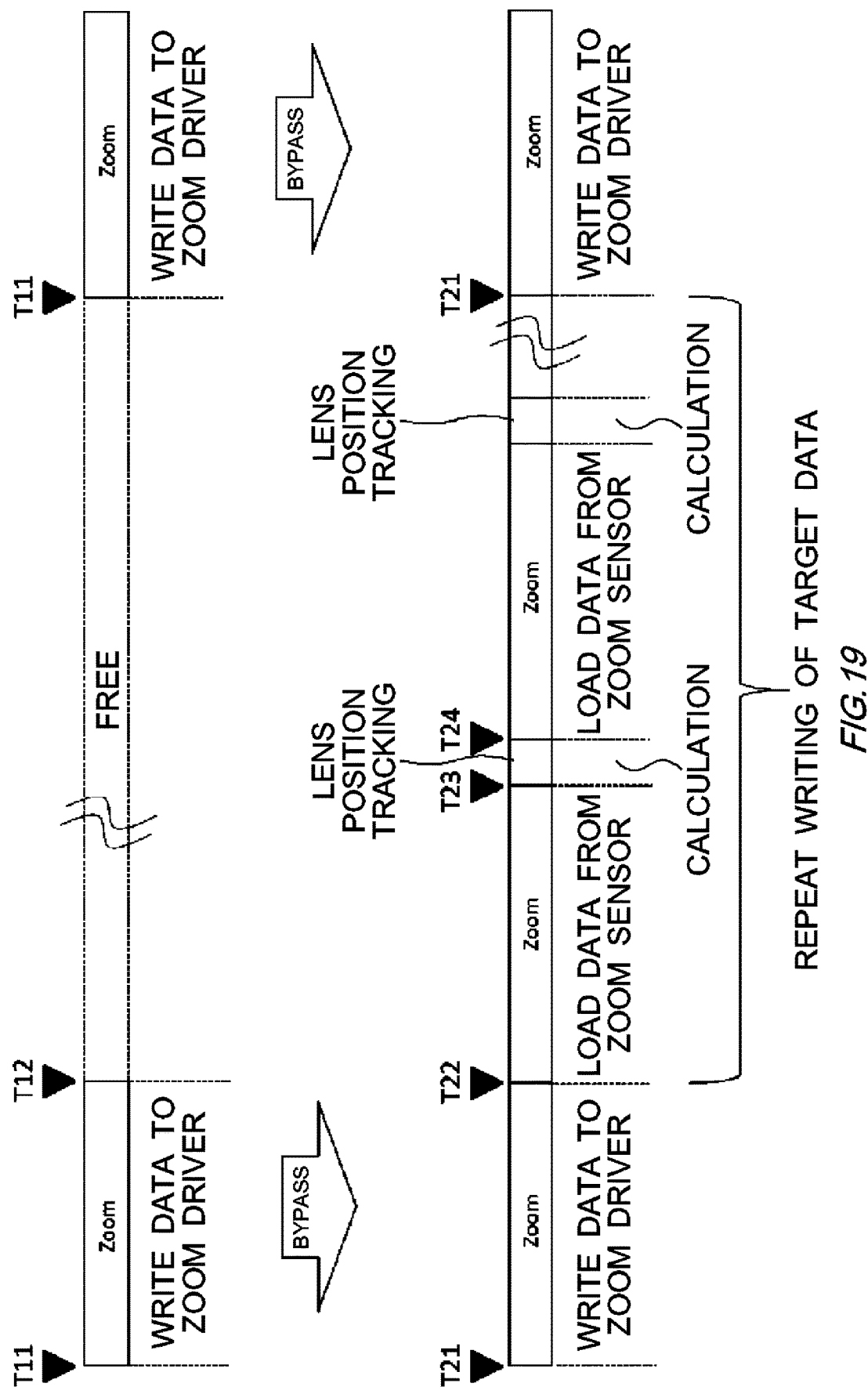
FIG. 19 shows a second example of a timing diagram of the camera module 10 according to the ninth embodiment.

FIG. 19 shows a second example of a timing diagram of the camera module 10 according to the ninth embodiment. The present drawing shows a case where the first driver 200'' is an AF driver and the second driver 300'' is a Zoom driver.

The upper part of the present drawing shows a process in connection to a first communication bus in between the controller 100' and the first driver 200". The lower part of the present drawing shows a process in connection to a second communication bus in between the first driver 200" and the second driver 300". In addition, in the present drawing, the horizontal axis indicates time.

First, focusing on the process in connection to the first communication bus (the upper part of the present drawing), in the period from time T11 to T12, a writing process of data to the second driver 300", that is, the Zoom driver, is executed. In this case, the first driver 200" bypasses the writing process from the controller 100' via the first communication bus to the second driver 300" via the second communication bus. From time T12 and later, until a next writing process of data to the Zoom driver is started, the process in connection to the first communication bus becomes free.

Then, focusing on the process in connection to the second communication bus (the lower part of the present drawing), in the period from time T21 (=time T11) to T22 (=time T12), a writing process of data to the second driver 300", that is, the Zoom driver is executed. In the period from time T22 to T23, a loading process of data from the second driver 300" is executed. In the period from time T23 to T24, a lens position tracking calculation is executed. From time T24 and later, until a next writing process to the Zoom driver is started, the process in the period from time T21 to T24 is executed repeatedly. For example, in this manner, the camera module 10 according to the present embodiment executes the AF/Zoom tracking process with the AF driver as a master.

In general, a Zoom and AF lens require to be tracked and controlled. In the camera module 10 according to the present embodiment, the first driver 200" that is one of the Zoom driver or the AF driver has a slave connection to the controller 100', and the second driver 300" that is the other one of the Zoom driver or the AF driver has a slave connection in relation to the first driver 200". The first driver 200" is also for performing a function as a sub-controller. In this way, according to the camera module 10 according to the present embodiment, it is possible to mitigate the processing load in the controller 100', such as that a lens position tracking calculation in the controller 100' is not required. In addition, according to the camera module 10 according to the present embodiment, communication for the lens position tracking calculation in the first communication bus is not required. Accordingly, according to the camera module 10 according to the present embodiment, since it is possible to increase the communication amount that can be handled in the communication buses, it is possible to further aim for high performance, and it allows for extensions such as increasing the number of devices that can be handled by the controller 100' or the like.

Figure 20:
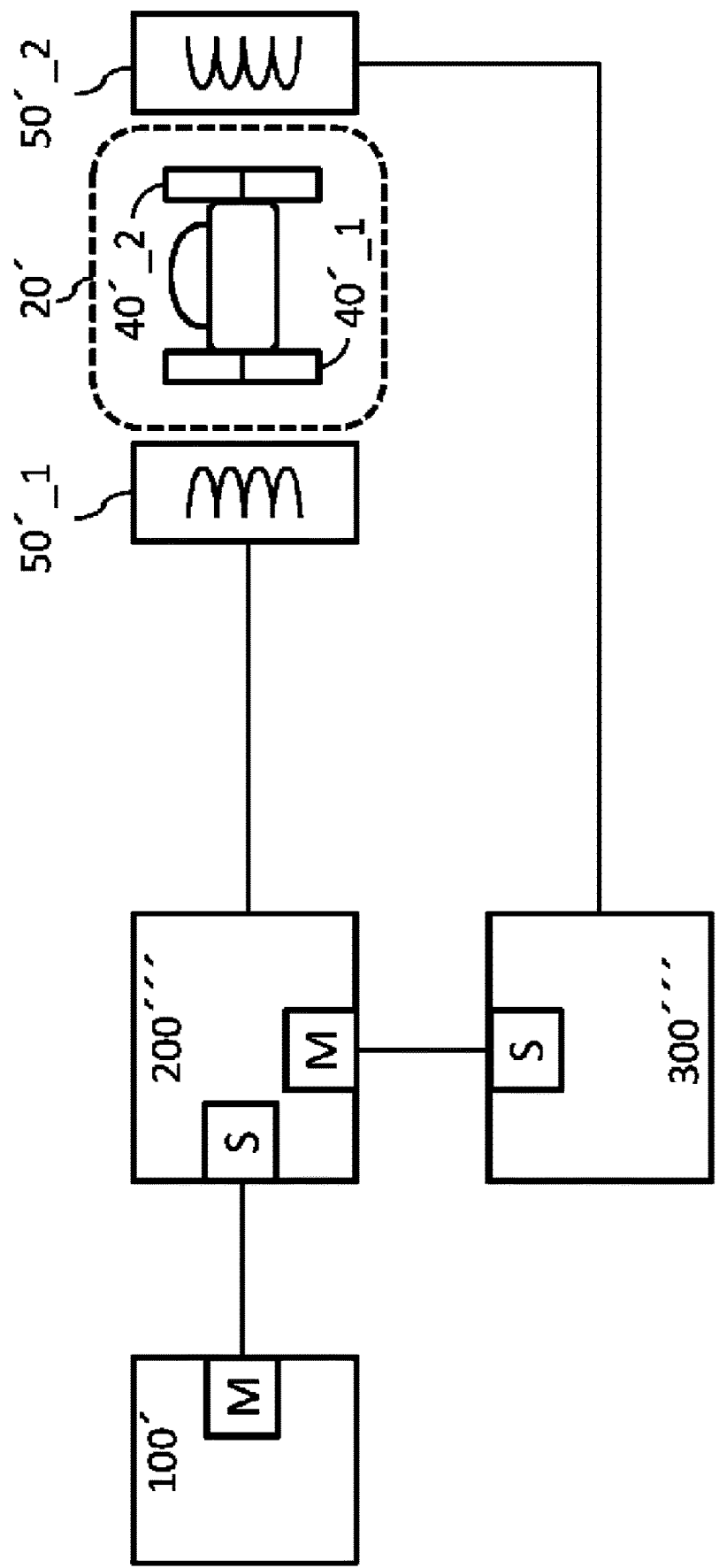
FIG. 20 shows an example of a block diagram of the camera module 10 according to a tenth embodiment.

FIG. 20 shows an example of a block diagram of the camera module 10 according to a tenth embodiment. The camera module 10 according to the present embodiment executes a drive extending and tilt correcting process. In the present drawing, the same signs are designated in relation to members having the same functions and configurations as those in FIG. 13, and the description thereof will be omitted except for the following differences.

Herein, for convenience of explanation, in FIG. 13, the "magnet 40'" is referred to as a "first magnet 40'_1" and the "coil 50'" is referred to as the "first coil 50'_1". The camera module 10 according to the present embodiment further includes a second magnet 40'_2 and the second coil 50'_2.

Herein, the second magnet 40'_2 may be provided on the object 20' in such a way so that it faces the first magnet 40'_1.

A first driver 200''' is a driver for driving the object 20 provided with the lens 30 in an optical axis direction of the lens 30. In the present embodiment, the first driver 200''' may be an AF driver.

A second driver 300''' is a driver for extending the drive capacity of the first driver 200'''. In addition, the second driver 300''' may have a position detecting function and be a driver for adjusting tilt of the object 20'. In the present embodiment, the second driver 300''' may be an extension driver including the position detecting function.

In such a case, a calculating unit 260''' including the first driver 200''' may correct the tilt in relation to an optical axis of the lens 30 in the object 20 based on position information.

Figure 21:
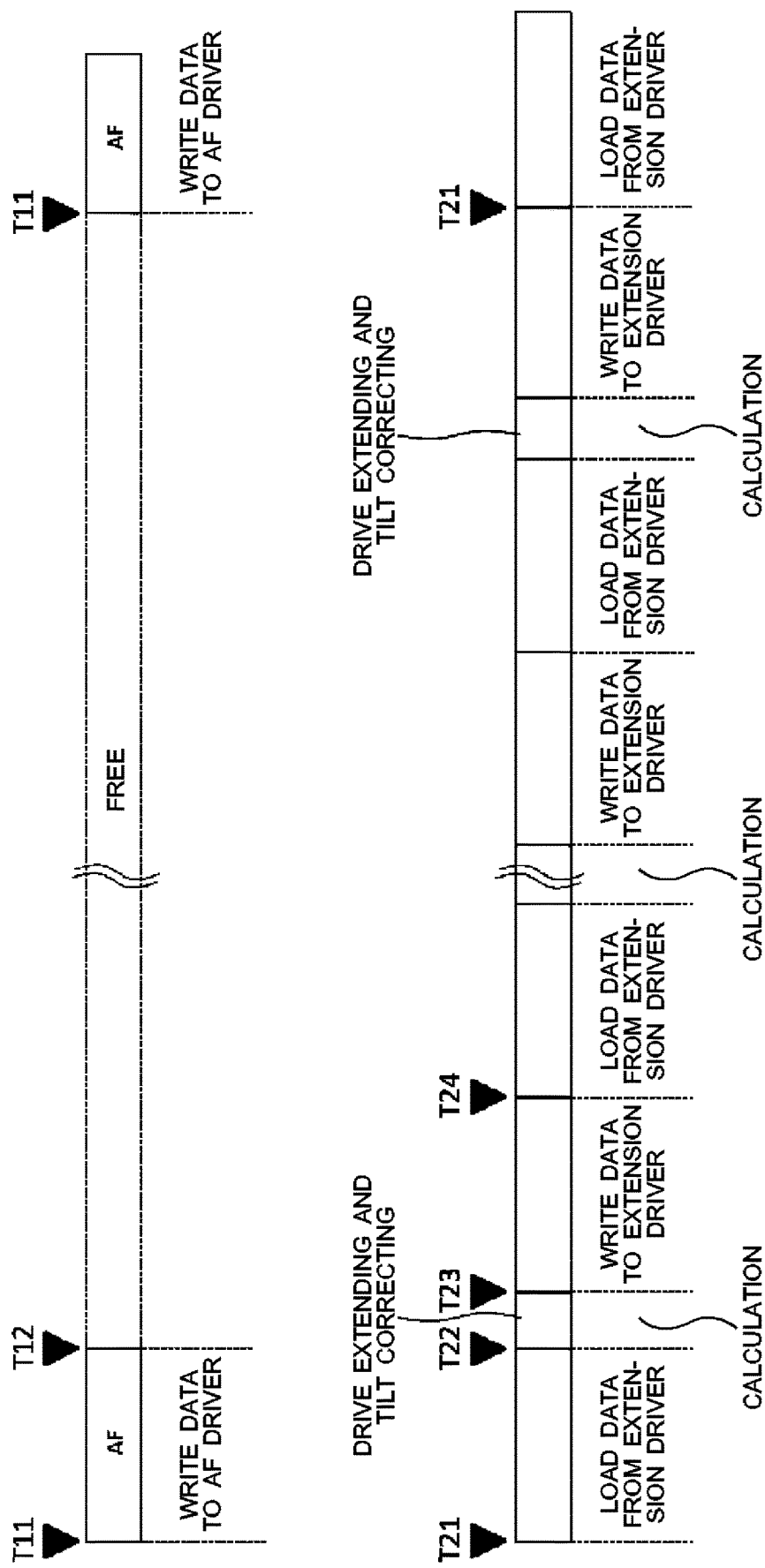
FIG. 21 shows an example of a timing diagram of the camera module 10 according to the tenth embodiment.

FIG. 21 shows an example of a timing diagram of the camera module 10 according to the tenth embodiment. The upper part of the present drawing shows a process in connection to a first communication bus in between the controller 100' and the first driver 200'''. The lower part of the present drawing shows a process in connection to a second communication bus in between the first driver 200''' and the second driver 300'''. In addition, in the present drawing, the horizontal axis indicates time.

First, focusing on the process in connection to the first communication bus (the upper part of the present drawing), in the period from time T11 to T12, a writing process of data to the first driver 200''', that is, the AF driver, is executed. From time T12 and later, until a next writing process of data to the AF driver is started, the process in connection to the first communication bus becomes free.

Then, focusing on the process in connection to the second communication bus (the lower part of the present drawing), in the period from time T21 (=time T11) to T22, a loading process of data from the second driver 300''', that is, the extension driver is executed. In the period from time T22 to T23, the drive extending and tilt correcting calculation is executed. That is, the calculating unit 260''' may calculate a drive amount and a tilt amount by the extension driver based on the position information. In the period from time T23 to T24, a writing process of data to the second driver 300''', that is, the extension driver is executed. From time T24 and later, until a next writing process to the AF driver is started, the process in the period from time T21 to T24 is executed repeatedly. For example, in this manner, the camera module 10 according to the present embodiment executes a drive extending and tilt correcting process.

In general, when controlling the object 20' by an AF/Zoom process over a long distance, a case is possible where the torque is not sufficient with just one driver and an extension of the driver is required. In addition, there may be a case where tilt correction is required. In the camera module 10 according to the present embodiment, the first driver 200''' that is the AF driver has a slave connection to the controller 100', and the second driver 300''' that is the extension driver has a slave connection in relation to the first driver 200'''. The first driver 200''' is also for performing a function as a sub-controller. In this way, according to the camera module 10 according to the present embodiment, it is possible to mitigate the processing load in the controller 100', such as that the drive extending and tilt correcting calculation in the controller 100' is not required. In addition, according to the camera module 10 according to the present embodiment, communication for the drive extending and tilt correcting calculation in the first communication bus is not required. Accordingly, according to the camera module 10 according to the present embodiment, since it is possible to increase the communication amount that can be handled in the communication buses, it is possible to further aim for high performance, and it allows for extensions such as increasing the number of devices that can be handled by the controller 100' or the like.

While the present invention has been described by using embodiments of the present invention, the technical scope of the present invention is not limited to the scope according to the above described embodiments. It is apparent to persons skilled in the art that various alterations or improvements can be added to the above-described embodiments. It is also apparent from the description of the scope of claims that the embodiments added with such alterations or improvements can be included in the technical scope of the present invention.

The actions, procedures, steps, and stages of each process performed by an apparatus, system, program, and method shown in the scope of claims, specification, or drawings can be executed in any order as long as the order is not indicated by "prior to," "before," or the like, and in addition, as long as the output from a previous process is not used in a later process. Even if the action flow is described by using phrases such as "first" or "then" in the scope of claims, specification, or drawings, it does not necessarily mean that the process must be performed in this order.

EXPLANATION OF REFERENCES

10 camera module
20 object
30 lens
40 magnets
50 coils
100 controller
110 high-order slave port
120 high-order master port
130 first position control unit
140 first master port
200 first driver
210 first slave port
220 first sensor
230 first driving unit
240 second position control unit
250 second master port
260 calculating unit
300 second driver
(300' position detector)
310 second slave port
320 second sensor
330 second driving unit
400 third driver
500 fourth driver

What is claimed is:

1. A camera module, comprising:
a controller that generates a first position control signal indicating a first target position to which an object provided with an image sensor or a lens is to be moved, and a first master port configured to output the first position control signal;
a first driver, including a first slave port connected to the first master port, configured to provide driving force to the object based on the first position control signal and to generate a second position control signal indicating a second target position to which the object is to be moved, and a second master port configured to output the second position control signal; and
a second driver controlled by the first driver, including a second slave port connected to the second master port, configured to provide driving force to the object based on the second position control signal;
wherein
the first driver further includes a first sensor configured to detect a position of the object, and
the first driver is configured to provide driving force to the object based on a first position signal indicating a position of the object detected by the first sensor, and the first position control signal;
the second driver further includes a second sensor configured to detect a position of the object, and
the second driver is configured to apply driving force to the object based on a second position signal indicating a position of the object detected by the second sensor, and the second position control signal; and
the first driver further is configured to correct, after the controller outputs the first position control signal and before the controller outputs a next one of the first position control signal, at least any of the first position control signal and the first position signal using the second position signal obtained directly by the second driver via the second master port, without use of the controller and the first slave port, wherein the driving force applied to the object is based on such correction to any of the first position signal and the first position control signal.

2. The camera module according to claim 1, wherein
the first driver is configured to correct at least any of the first position control signal, the first position signal, and the second position control signal in such a way so as to reduce mutual interference by drive of the object by the first driver and drive of the object by the second driver.

3. The camera module according to claim 1, wherein
when the first driver is configured to drive a first object provided with a first lens, and the second driver is configured to drive a second object provided with a second lens, the first driver is configured to correct at least any of the first position control signal, the first position signal, and the second position control signal in such a way so that the first object and the second object interlock.

4. The camera module according to claim 1, wherein
communication between master and slave is serial communication.

5. The camera module according to claim 1, wherein
the camera module is capable of executing at least any of optical image stabilization, auto focus, and zoom processes.

6. A driver, wherein the driver is connected to a controller that is configured to generate a first position control signal indicating a first target position to which an object provided with an image sensor or a lens is to be moved, and having a first master port configured to output the first position control signal, the driver comprises:
a first slave port connected to the first master port;
a second master port configured to output a second position control signal to another driver; and
a first sensor that detects a position of the object;
wherein
the driver is configured to
provide driving force to the object based on the first position control signal;

generate the second position control signal indicating a second target position to which the object is to be moved;

to provide driving force to the object based on a first position signal indicating a position of the object detected by the first sensor, and the first position control signal, and correct, after the controller outputs the first position control signal and before the controller outputs a next one of the first position control signal, at least any of the first position control signal and the first position signal at least based on a using a second position signal obtained directly by the another driver via the second master port, without use of the controller and the first slave port, wherein the second position signal is different from the first position signal, wherein the driving force applied to the object is based on such correction to any of the first position signal and the first position control signal.

7. A position control system, comprising:

a controller configured to generate a first position control signal indicating a first target position to which an object provided with an image sensor or a lens is to be moved, and a first master port configured to output the first position control signal;

a first driver including a first slave port connected to the first master port, configured to provide driving force to the object based on the first position control signal and to generate a second position control signal indicating a second target position to which the object is to be moved, and a second master port configured to output the second position control signal; and a second driver including a second slave port connected to the second master port, configured to provide driving force to the object based on the second position control signal;

wherein the first driver further includes a first sensor configured to detect a position of the object, and the first driver is configured to provide driving force to the object based on a first position signal indicating a position of the object detected by the first sensor, and the first position control signal;

the second driver further includes a second sensor configured to detect a position of the object, and the second driver is configured to apply driving force to the object based on a second position signal indicating a position of the object detected by the second sensor, and the second position control signal; and the first driver is configured to correct, after the controller outputs the first position control signal and before the controller outputs a next one of the first position control signal, at least any of the first position control signal and the first position signal using the second position signal obtained directly by the second driver via the second master port, without use of the controller and the first slave port, wherein the driving force applied to the object is based on such correction to any of the first position signal and the first position control signal.

* * * * *